United States Patent
Selvanesan et al.

(10) Patent No.: US 12,464,599 B2
(45) Date of Patent: Nov. 4, 2025

(54) NR SIDELINK DISCONTINUOUS RECEPTION RESOURCE ALLOCATION

(71) Applicant: Fraunhofer-Gesellschaft zur Foerderung der angewandten Forschung e.V., Munich (DE)

(72) Inventors: Sarun Selvanesan, Berlin (DE); Baris Goektepe, Berlin (DE); Thomas Fehrenbach, Berlin (DE); Thomas Wirth, Berlin (DE); Thomas Schierl, Berlin (DE); Cornelius Hellge, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 458 days.

(21) Appl. No.: 17/947,806

(22) Filed: Sep. 19, 2022

(65) Prior Publication Data
US 2023/0084999 A1    Mar. 16, 2023

Related U.S. Application Data

(63) Continuation of application No. PCT/EP2021/056929, filed on Mar. 18, 2021.

(30) Foreign Application Priority Data

Mar. 20, 2020   (EP) .................................... 20164707

(51) Int. Cl.
*H04W 76/28* (2018.01)
*H04W 52/02* (2009.01)
(Continued)

(52) U.S. Cl.
CPC ....... *H04W 76/28* (2018.02); *H04W 52/0216* (2013.01); *H04W 72/02* (2013.01); *H04W 72/25* (2023.01); *H04W 92/18* (2013.01)

(58) Field of Classification Search
CPC ............ H04W 74/0808; H04W 76/28; H04W 52/0216; H04W 72/02; H04W 76/14;
(Continued)

(56) References Cited

U.S. PATENT DOCUMENTS

2016/0227518 A1*  8/2016  Li ....................... H04W 76/14
2020/0170002 A1   5/2020  Lee et al.
(Continued)

FOREIGN PATENT DOCUMENTS

CN    110892765 A    3/2020
EP    3821658 A1    5/2021
(Continued)

OTHER PUBLICATIONS

Fraunhofer, HHI, et al., "NR Sidelink Resource Allocation for UE Power Saving", vol. RAN WG1, No. e-Meeting; Jan. 25, 2021-Feb. 5, 2021, (Jan. 18, 2021), 3GPP Draft; R1-2100701, 3rd Generation Partnership Project (3GPP), Mobile Competence Centre; 650, Route Des Lucioles; F-06921 Sophia-Antipolis Cedex; Franceurl: https://ftp.3gpp.org/tsg_ran/WG1_RL1/TSGR1_104-e/Docs/R1-2100701.zip R1-2100701_NR_SL_RA_UE_pow_sav.docx, (Jan. 18, 2021), XP051970474, 8 pp.

(Continued)

*Primary Examiner* — Michael K Phillips
(74) *Attorney, Agent, or Firm* — Perkins Coie LLP; Michael A. Glenn

(57) ABSTRACT

A user device, UE, for a wireless communication system communicates with one or more further UEs using a sidelink, SL. The UE is to operate in a Discontinuous Reception, DRX, mode. When being out-of-coverage, the UE is to obtain one or more resources available for a transmission from an assistance information message, AIM, received from one or more of the further UEs during an ON duration of one or more DRX cycles, and/or (Continued)

by carrying out sensing in a set of sidelink resources or in a sidelink resource pool of the wireless communication system during an ON duration of one or more DRX cycles, and/or by carrying out sensing in a set of sidelink resources or in a sidelink resource pool of the wireless communication system during a listening duration.

18 Claims, 9 Drawing Sheets

(51) Int. Cl.
*H04W 72/02* (2009.01)
*H04W 72/25* (2023.01)
*H04W 92/18* (2009.01)

(58) Field of Classification Search
CPC ....... H04W 72/25; H04W 4/40; H04W 72/51; H04W 72/542; H04W 72/56; H04W 92/18; Y02D 30/70
See application file for complete search history.

(56) References Cited

U.S. PATENT DOCUMENTS

| | | | |
|---|---|---|---|
| 2021/0059005 A1* | 2/2021 | Hosseini | H04W 76/28 |
| 2021/0219268 A1* | 7/2021 | Li | H04L 1/1819 |
| 2021/0227465 A1* | 7/2021 | Kung | H04W 52/0216 |
| 2021/0235328 A1* | 7/2021 | Hui | H04W 72/56 |
| 2022/0353815 A1* | 11/2022 | Lin | H04W 76/28 |
| 2023/0055280 A1* | 2/2023 | Hwang | H04W 72/20 |
| 2023/0063472 A1* | 3/2023 | Freda | H04W 52/0274 |

FOREIGN PATENT DOCUMENTS

| | | |
|---|---|---|
| WO | 2019022470 A1 | 1/2019 |
| WO | 2019022504 A1 | 1/2019 |
| WO | 2020033088 A1 | 2/2020 |

OTHER PUBLICATIONS

Fraunhofer, HHI, et al., "Resource Allocation Enhancements for Mode 2", vol. RAN WG1, No. e-Meeting; Jan. 25, 2021-Feb. 5, 2021, (Jan. 18, 2021), 3GPP Draft; R1-2100702, 3rd Generation Partnership Project (3GPP), Mobile Competence Centre; 650, Route Des Lucioles; F-06921 Sophia-Antipolis Cedex; France, URL: https://ftp.3gpp.org/tsg_ran/WG1_RL1/TSGR1_104-e/Docs/R1-2100702.zip R1-2100702_SL_RA_M2enh.docx, (Jan. 18, 2021), XP051970475, 13 pp.

Fraunhofer, IIS, et al., "Inter-UE Coordination for Sidelink Mode 2 Resource Allocation", vol. RAN WG2, No. Online; Jan. 25, 2021-Feb. 5, 2021, (Jan. 14, 2021), 3GPP Draft; R2-2100576, 3rd Generation Partnership Project (3GPP), Mobile Competence Centre; 650, Route Des Lucioles; F-06921 Sophia-Antipolis Cedex; France, URL: https://ftp.3gpp.org/tsg_ran/WG2_RL2/TSGR2_113-e/Docs/R2-2100576.zip R2-2100576_RA-InterUECoordination.docx, (Jan. 14, 2021), XP051972701, 6 pp.

Fraunhofer HHI, "Resource Allocation for Mode 2 NR V2X", 3GPP TSG-RAN WG2 Meeting #108 R2-1915555, Nov. 8, 2019.

Intel Corporation, "Design Options for eNB-Controlled and Relay UE-Assisted Resource Allocation", R1-1712519, 3GPP TSG RAN WG1 #90, 3GPP Server release Date (Aug. 12, 2017).

* cited by examiner

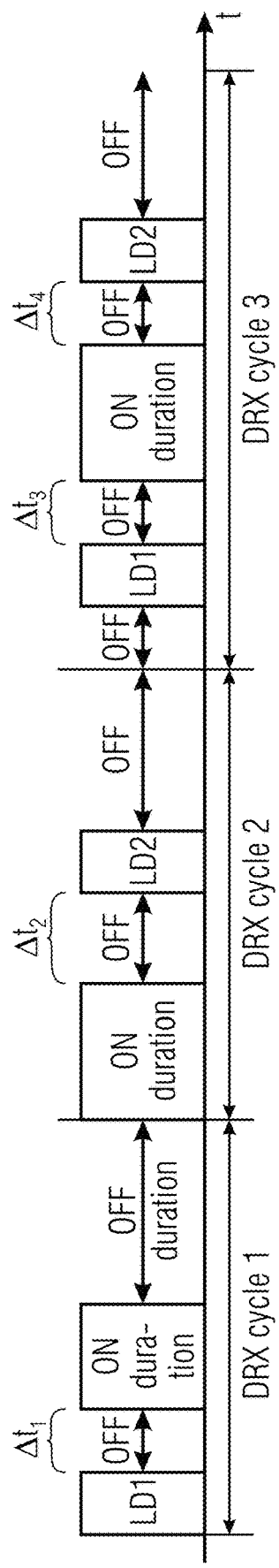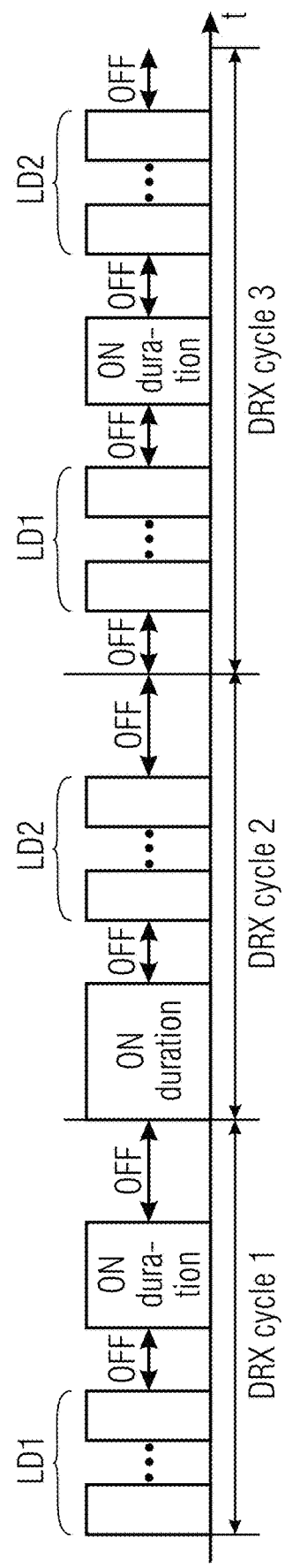
Fig. 9(a)
Fig. 9(b)

① - sensing in SL RP

NR SIDELINK DISCONTINUOUS RECEPTION RESOURCE ALLOCATION

CROSS-REFERENCE TO RELATED APPLICATIONS

This application is a continuation of copending International Application No. PCT/EP2021/056929, filed Mar. 18, 2021, which is incorporated herein by reference in its entirety, and additionally claims priority from European Application No. 20164707.0, filed Mar. 20, 2020, which is also incorporated herein by reference in its entirety.

The present application relates to the field of wireless communication systems or networks, more specifically to a discontinuous reception, DRX, on a sidelink, SL. Embodiments of the present invention concern the resource allocation in case of a DRX on a SL.

BACKGROUND OF THE INVENTION

FIG. 1 is a schematic representation of an example of a terrestrial wireless network 100 including, as is shown in FIG. 1(a), a core network 102 and one or more radio access networks $RAN_1$, $RAN_2$, ... $RAN_N$. FIG. 1(b) is a schematic representation of an example of a radio access network $RAN_n$ that may include one or more base stations $gNB_1$ to $gNB_5$, each serving a specific area surrounding the base station schematically represented by respective cells $106_1$ to $106_5$. The base stations are provided to serve users within a cell. The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles, UAVs, the latter also referred to as drones, buildings and other items or devices having embedded therein electronics, software, sensors, actuators, or the like as well as network connectivity that enables these devices to collect and exchange data across an existing network infrastructure. FIG. 1(b) shows an exemplary view of five cells, however, the $RAN_n$ may include more or less such cells, and $RAN_n$ may also include only one base station. FIG. 1(b) shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 1(b) shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user UEs as is schematically represented by arrow $112_2$. The respective base station $gNB_1$ to $gNB_5$ may be connected to the core network 102, e.g., via the S1 interface, via respective backhaul links $114_1$ to $114_5$, which are schematically represented in FIG. 1(b) by the arrows pointing to "core". The core network 102 may be connected to one or more external networks. The external network may be the Internet, or a private network, such as an Intranet or any other type of campus networks, e.g., a private WiFi or 4G or 5G mobile communication system. Further, some or all of the respective base station $gNB_1$ to $gNB_5$ may be connected, e.g., via the S1 or X2 interface or the XN interface in NR, with each other via respective backhaul links $116_1$ to $116_5$, which are schematically represented in FIG. 1(b) by the arrows pointing to "gNBs". A sidelink channel allows direct communication between UEs, also referred to as device-to-device, D2D, communication. The sidelink interface in 3GPP is named PC5.

For data transmission a physical resource grid may be used. The physical resource grid may comprise a set of resource elements to which various physical channels and physical signals are mapped. For example, the physical channels may include the physical downlink channel, PDSCH, the physical uplink shared channel, PUSCH, and the physical sidelink shared channel, PSSCH, carrying user specific data, also referred to as downlink, uplink or sidelink payload data, the physical broadcast channel, PBCH, and the physical sidelink broadcast channel, PSBCH, carrying for example a master information block, MIB, and one or more of a system information block, SIB, one or more sidelink information blocks (SLIBs) if supported, the physical downlink control channel, PDCCH, the physical uplink control channel, PUCCH, and the physical sidelink control channels, PSSCH, carrying for example the downlink control information, DCI, the uplink control information, UCI, or the sidelink control information, SCI. The sidelink interface may also support a 2-stage SCI, which refers to a first control region containing some parts of the SCI, and, optionally, a second control region, which contains a second part of control information.

For the uplink, the physical channels may further include the physical random access channel, PRACH or RACH, used by UEs for accessing the network once a UE synchronized and obtained the MIB and SIB. The physical signals may comprise reference signals or symbols, RS, synchronization signals and the like. The resource grid may comprise a frame or radio frame having a certain duration in the time domain and having a given bandwidth in the frequency domain. The frame may have a certain number of subframes of a predefined length, e.g., 1 ms. Each subframe may include one or more slots of 12 or 14 OFDM symbols depending on the cyclic prefix, CP, length. A frame may also consist of a smaller number of OFDM symbols, e.g., when utilizing shortened transmission time intervals, sTTI, or a mini-slot/non-slot-based frame structure comprising just a few OFDM symbols.

The wireless communication system may be any single-tone or multicarrier system using frequency-division multiplexing, like the orthogonal frequency-division multiplexing, OFDM, system, the orthogonal frequency-division multiple access, OFDMA, system, or any other IFFT-based signal with or without CP, e.g., DFT-s-OFDM. Other waveforms, like non-orthogonal waveforms for multiple access, e.g., filter-bank multicarrier, FBMC, generalized frequency division multiplexing, GFDM, or universal filtered multi carrier, UFMC, may be used. The wireless communication system may operate, e.g., in accordance with the LTE-Advanced pro standard, or the 5G or NR, New Radio, standard, or the NR-U, New Radio Unlicensed, standard.

The wireless network or communication system depicted in FIG. 1 may be a heterogeneous network having distinct overlaid networks, e.g., a network of macro cells with each macro cell including a macro base station, like base station $gNB_1$ to $gNB_5$, and a network of small cell base stations, not shown in FIG. 1, like femto or pico base stations. In addition to the above described terrestrial wireless network also non-terrestrial wireless communication networks, NTN, exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

In mobile communication networks, for example in a network like that described above with reference to FIG. 1, like an LTE or 5G/NR network, there may be UEs that communicate directly with each other over one or more sidelink, SL, channels, e.g., using the PC5 or PC3 interface or WiFi direct. UEs that communicate directly with each other over the sidelink may include vehicles communicating directly with other vehicles, V2V communication, vehicles communicating with other entities of the wireless communication network, V2X communication, for example roadside units, RSUs, roadside entities, like traffic lights, traffic signs, or pedestrians. RSUs may have functionalities of BS or of UEs, depending on the specific network configuration. Other UEs may not be vehicular related UEs and may comprise any of the above-mentioned devices. Such devices may also communicate directly with each other, D2D communication, using the SL channels.

When considering two UEs directly communicating with each other over the sidelink, both UEs may be served by the same base station so that the base station may provide sidelink resource allocation configuration or assistance for the UEs. For example, both UEs may be within the coverage area of a base station, like one of the base stations depicted in FIG. 1. This is referred to as an "in-coverage" scenario. Another scenario is referred to as an "out-of-coverage" scenario. It is noted that "out-of-coverage" does not mean that the two UEs are not within one of the cells depicted in FIG. 1, rather, it means that these UEs

- may not be connected to a base station, for example, they are not in an RRC connected state, so that the UEs do not receive from the base station any sidelink resource allocation configuration or assistance, and/or
- may be connected to the base station, but, for one or more reasons, the base station may not provide sidelink resource allocation configuration or assistance for the UEs, and/or
- may be connected to the base station that may not support NR V2X services, e.g., GSM, UMTS, LTE base stations.

When considering two UEs directly communicating with each other over the sidelink, e.g., using the PC5/PC3 interface, one of the UEs may also be connected with a BS, and may relay information from the BS to the other UE via the sidelink interface and vice-versa. The relaying may be performed in the same frequency band, in-band-relay, or another frequency band, out-of-band relay, may be used. In the first case, communication on the Uu and on the sidelink may be decoupled using different time slots as in time division duplex, TDD, systems.

FIG. 2 is a schematic representation of an in-coverage scenario in which two UEs directly communicating with each other are both connected to a base station. The base station gNB has a coverage area that is schematically represented by the circle 200 which, basically, corresponds to the cell schematically represented in FIG. 1. The UEs directly communicating with each other include a first vehicle 202 and a second vehicle 204 both in the coverage area 200 of the base station gNB. Both vehicles 202, 204 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. In other words, the gNB provides SL resource allocation configuration or assistance for the UEs, and the gNB assigns the resources to be used for the V2V communication over the sidelink. This configuration is also referred to as a mode 1 configuration in NR V2X or as a mode 3 configuration in LTE V2X.

FIG. 3 is a schematic representation of an out-of-coverage scenario in which the UEs directly communicating with each other are either not connected to a base station, although they may be physically within a cell of a wireless communication network, or some or all of the UEs directly communicating with each other are to a base station but the base station does not provide for the SL resource allocation configuration or assistance. Three vehicles 206, 208 and 210 are shown directly communicating with each other over a sidelink, e.g., using the PC5 interface. The scheduling and/or interference management of the V2V traffic is based on algorithms implemented between the vehicles. This configuration is also referred to as a mode 2 configuration in NR V2X or as a mode 4 configuration in LTE V2X. As mentioned above, the scenario in FIG. 3 which is the out-of-coverage scenario does not necessarily mean that the respective mode 2 UEs in NR or mode 4 UEs in LTE are outside of the coverage 200 of a base station, rather, it means that the respective mode 2 UEs in NR or mode 4 UEs in LTE are not served by a base station, are not connected to the base station of the coverage area, or are connected to the base station but receive no SL resource allocation configuration or assistance from the base station. Thus, there may be situations in which, within the coverage area 200 shown in FIG. 2, in addition to the NR mode 1 or LTE mode 3 UEs 202, 204 also NR mode 2 or LTE mode 4 UEs 206, 208, 210 are present. In addition, FIG. 3, schematically illustrates an out of coverage UE using a relay to communicate with the network. For example, the UE 210 may communicate over the sidelink with UE1 which, in turn, may be connected to the gNB via the Uu interface. Thus, UE1 may relay information between the gNB and the UE 210

Although FIG. 2 and FIG. 3 illustrate vehicular UEs, it is noted that the described in-coverage and out-of-coverage scenarios also apply for non-vehicular UEs. In other words, any UE, like a hand-held device, communicating directly with another UE using SL channels may be in-coverage and out-of-coverage.

In a wireless communication system or network, like the one described above with reference to FIG. 1, relay devices or relay nodes may be employed to solve performance issues, like a reduced data rate, a weaker signal and higher interference as it may be encountered on the radio coverage edges of a cell of a base station. The relay node may extract data from a received signal, apply noise correction and retransmit a new signal on its own. Rather than only repeating the signal, the relay node also increases the signal quality. In the 3GPP specifications for 4G, a UE-to-Network relay has been specified. FIG. X illustrates a scenario where a relay UE operates as a UE-to-Network relay. The relay device or relay node mentioned above may be a user equipment, UE, and, in the following, is referred to a relay UE. FIG. X illustrates a UE 200 that is to connect to a destination 202, e.g., to an entity of the access network 202a, like a gNB, of to an entity of the core network 202a. The end-to-end communication between the UE 200, that is also referred to as the remote UE, and the destination uses a relay UE 206 that provides functionality to support connectivity to the destination in the core network 202 for the remote UE 200. The remote UE 200 and the relay UE may communicate using the PC5 interface, and the relay UE and the access network may communicate using the Uu interface.

In NR or 5G, in addition to the UE-to-Network relay, also a UE-to-UE relay is supported. In such a scenario, the destination 202 is another UE. FIG. Y illustrates a scenario where the relay is a UE-to-UE relay 206. The remote UE 200 is to connect to the other UE 202, and the relay UE 206 provides functionality to support connectivity to the destination UE 208, for the remote UE 200. The remote UE 200 and the relay UE may communicate using the PC5 interface, and the relay UE and the other UE 202 may communicate using also the PC5 interface.

Although FIG. 4 and FIG. 5 illustrate the relay to be a UE, it is noted that the relay may be any entity having network connectivity and enabling that the remote UE 200 is connected to the destination 202, like the core network or another UE. For example, the relay entity could be a group leader UE, a roadside unit, RSU, or any mobile or stationary device. Such a relay entity may be a relay node having some base station functionality, such as scheduling of resources, etc. Furthermore, a relay can also be a relay node in the classical sense, e.g. a base station infrastructure device, providing relaying functionality as in an amplify and forward (AF) relay, or a decode-and-forward relay (DF), e.g. operating on layer-2 (L2), or even a layer-3 (L3), which forwards data on Internet Protocol (IP)-level.

In the above-described scenarios of vehicular user devices, UEs, a plurality of such user devices may form a user device group, also referred to simply as group, and the communication within the group or among the group members may be performed via the sidelink interfaces between the user devices, like the PC5 interface. For example, the above-described scenarios using vehicular user devices may be employed in the field of the transport industry in which a plurality of vehicles being equipped with vehicular user devices may be grouped together, for example, by a remote driving application. Other use cases in which a plurality of user devices may be grouped together for a sidelink communication among each other include, for example, factory automation and electrical power distribution. In the case of factory automation, a plurality of mobile or stationary machines within a factory may be equipped with user devices and grouped together for a sidelink communication, for example for controlling the operation of the machine, like a motion control of a robot. In the case of electrical power distribution, entities within the power distribution grid may be equipped with respective user devices which, within a certain area of the system may be grouped together so as to communicate via a sidelink communication with each other so as to allow for monitoring the system and for dealing with power distribution grid failures and outages.

Naturally, in the above-mentioned use cases sidelink communication is not limited to a communication within a group. Rather, the sidelink communication may be among any of UEs, like any pair of UEs.

In a wireless communication system as described above with reference to FIG. 1, FIG. 2 or FIG. 3, a UE communicating over the sidelink may operate in a discontinuous reception, DRX, mode.

SUMMARY

An embodiment may have a user device, UE, for a wireless communication system, the wireless communication system including a plurality of user devices, UEs, wherein the UE is to communicate with one or more further UEs using a sidelink, SL, wherein the UE is to operate in a Discontinuous Reception, DRX, mode, and wherein, when being out-of-coverage, the UE is to obtain one or more resources available for a transmission from an assistance information message, AIM, received from one or more of the further UEs during an ON duration of one or more DRX cycles, and/or from an assistance information message, AIM, received from one or more of the further UEs during a listening duration, and/or by carrying out sensing in a set of sidelink resources or in a sidelink resource pool of the wireless communication system during an ON duration of one or more DRX cycles, and/or by carrying out sensing in a set of sidelink resources or in a sidelink resource pool of the wireless communication system during a listening duration.

Another embodiment may have a user device, UE, for a wireless communication system, the wireless communication system including a plurality of user devices, UEs, wherein the UE is to communicate with one or more further UEs using a sidelink, SL, wherein the UE is to carry out sensing in a SL resource pool and to determine resources available for a transmission, or obtains the resources from a base station of the wireless communication system directly or indirectly, e.g., via a relay, and wherein the UE is to transmit the determined resources available for a transmission, e.g., using an assistance information message, AIM.

Another embodiment may have a wireless communication system, comprising a plurality of inventive user devices, UEs, and configured for a sidelink communication using, for example resources from a set of sidelink resources of the wireless communication system.

According to another embodiment, a method for operating a user device, UE, of a wireless communication system including a plurality of user devices, UEs, may have the steps of: operating the UE to communicate with one or more further UEs using a sidelink, SL, operating the UE in a Discontinuous Reception, DRX, mode, and when being out-of-coverage, obtaining, by the UE, one or more resources available for a transmission from an assistance information message, AIM, received from one or more of the further UEs during an ON duration of one or more DRX cycles, and/or from an assistance information message, AIM, received from one or more of the further UEs during a listening duration, and/or by carrying out sensing in a set of sidelink resources or in a sidelink resource pool of the wireless communication system during an ON duration of one or more DRX cycles, and/or by carrying out sensing in a set of sidelink resources or in a sidelink resource pool of the wireless communication system during a listening duration.

According to another embodiment, a method for operating a user device, UE, of a wireless communication system including a plurality of user devices, UEs, may have the steps of: operating the UE to communicate with one or more further UEs using a sidelink, SL, carrying out sensing, by the UE, in a SL resource pool and to determine resources available for a transmission, or obtains the resources from a base station of the wireless communication system directly or indirectly, e.g., via a relay, and transmitting, by the UE, the determined resources available for a transmission, e.g., using an assistance information message, AIM.

Another embodiment may have a non-transitory digital storage medium having a computer program stored thereon to perform any of the inventive methods when said computer program is run by a computer.

BRIEF DESCRIPTION OF THE DRAWINGS

Embodiments of the present invention will be detailed subsequently referring to the appended drawings, in which:

FIG. 9a-b illustrates DRX cycles in accordance with embodiments of the present invention including one or more listening;

DETAILED DESCRIPTION OF THE INVENTION

Figure 1A:
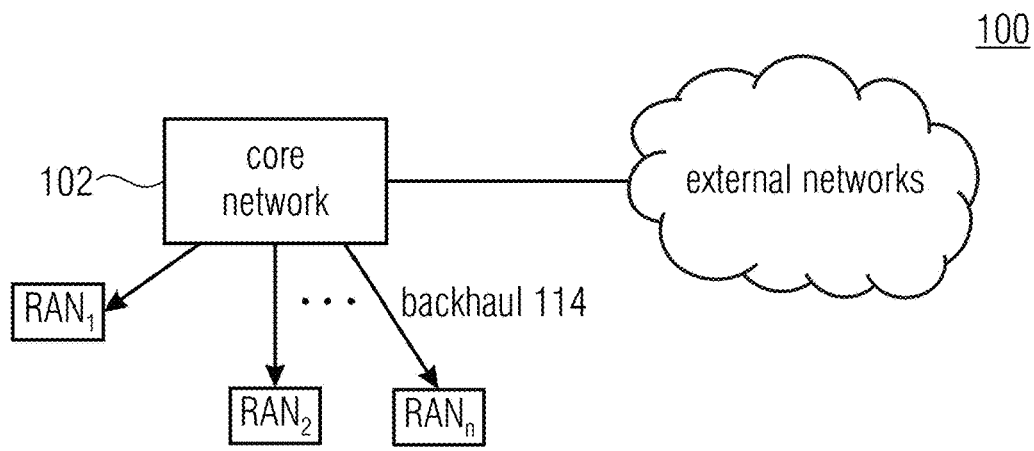
FIG. 1a-b shows a schematic representation of an example of a wireless communication system.

Embodiments of the present invention are now described in more detail with reference to the accompanying drawings in which the same or similar elements have the same reference signs assigned.

In the wireless communication system or network, like the one described above with reference to FIG. 1, FIG. 2 or FIG. 3, a sidelink communication among the respective user devices may be implemented, for example, a vehicle-to-vehicle communication, V2V, a vehicle-to-anything communication, or any device-to-device, D2D, communication among any other use devices, for example, those mentioned above. However, in a NR-Uu operation or in a sidelink operation, like a PC5 operation, the UE is awake at all times and monitors the control channel in every subframe in order to be able to receive from the network and from another UE, respectively. This increases the power consumption at the UE, since the UE is on, even when there is no data to be transmitted or received. For vehicular use cases, like NR V2X, power saving may not be a concern since the vehicular UEs, V-UEs, are devices with a sufficient power source, e.g., an onboard battery of the vehicle.

However, the sidelink communication or the sidelink PC5 operation is not limited to the operation of vehicular UEs, but other UEs with a limited or finite power supply, like regular user devices including a battery that needs to be recharged regularly, may communicate over the sidelink. Such UEs may include so-called vulnerable road users, VUEs, like a pedestrian UE, P-UE, or first responder devices for public safety use cases, or IoT devices, like general IoT UEs or industrial IoT UEs. For these types of UEs, since they are not connected to a constant power supply but rely on their battery, power saving is important.

To reduce the power consumption at a UE in NR, the discontinuous reception, DRX, is employed on the Uu interface. DRX is a mechanism where the UE goes into a sleep mode for a certain period of time, during which it does not transmit or receive any data. The UE wakes for another period of time, where it may transmit and receive data. One the key aspects of DRX is the synchronization between the UE and the network in terms of its wake-up and sleep cycles, also referred to as the DRX cycles. In a worst-case scenario, the network tries to send data to the UE being in the sleep mode so that, when the UE wakes up, there is no data to be received. In the NR-Uu interface this situation is prevented by maintaining a well-defined agreement between the UE and the network or system in terms of the sleep and wake-up cycles. In other words, by configuring a UE with DRX by the gNB, the DRX is synchronized with the gNB. A DRX cycle includes both the ON time and the OFF time within a fixed time interval, and for the NR Uu interface a short DRX cycle and a long DRX cycle is defined, where a short DRX cycle may span a few symbols within a time slot, and a long DRX cycle may span an entire time slot or multiple time slots. An inactivity timer may specify the number of consecutive control messages for which the UE may be active after successfully decoding of a control message that indicates a new transmission, with the following configuration:

the timer is restarted upon receiving a control message for
a new transmission and/or any other control message which is addressed to the UE, e.g. scrambled by UE-specific RNTI or group-specific RNTI,
upon the expiry of the timer, the UE goes to DRX mode or OFF time.

To reduce the power consumption also at a UE in NR communicating over the sidelink, the DRX mode may also be implemented on the sidelink. A UE communicating over the sidelink may be in-coverage or out-of-coverage, as explained above with reference to FIG. 2 and with reference to FIG. 3. When the UE is in-coverage, even when operating over the sidelink in the DRX mode, the gNB, which is aware of the DRX cycles, handles the resource allocation for transmissions by a UE over the sidelink. This is not possible when the UE is out-of-coverages, e.g., in case the UE operates in Mode 2.

Figure 1B:
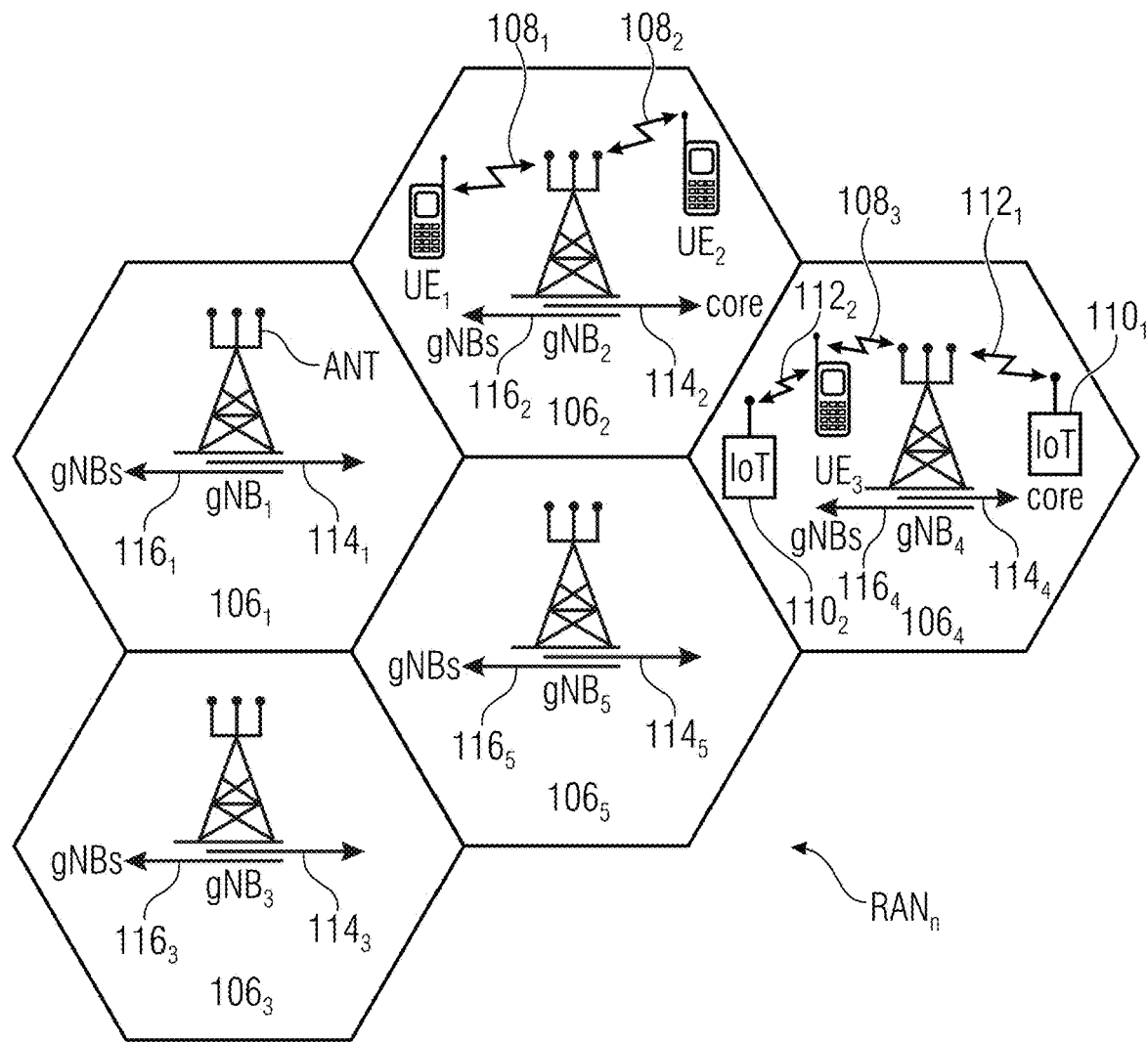
Figure 2:
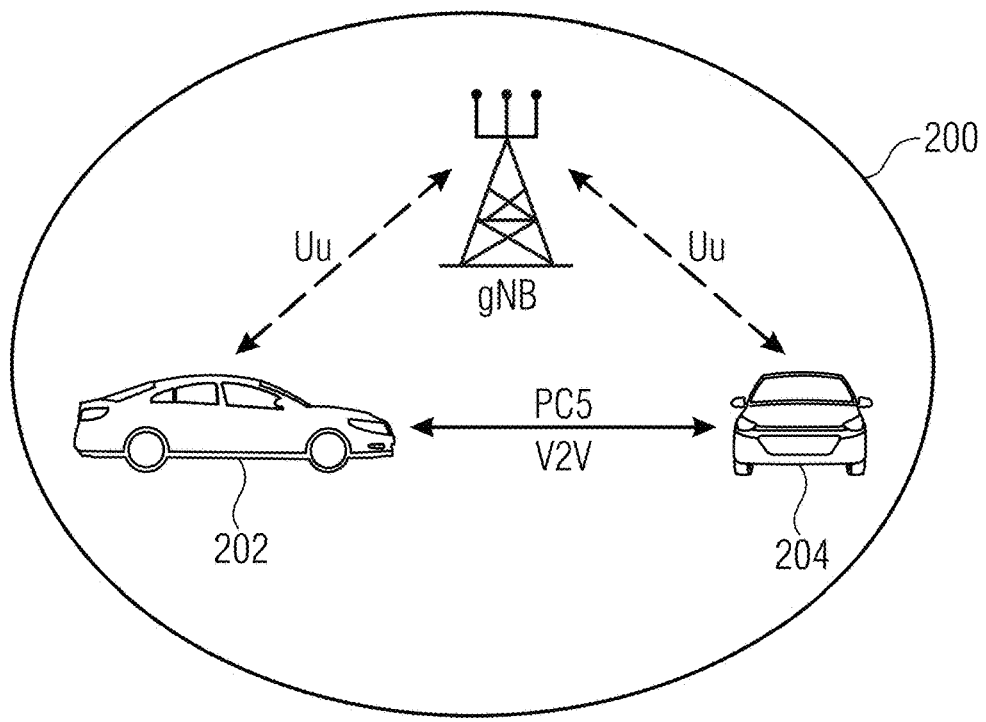
FIG. 2 is a schematic representation of an in-coverage scenario in which two UEs directly communicating with each other are both connected to a base station.
Figure 3:
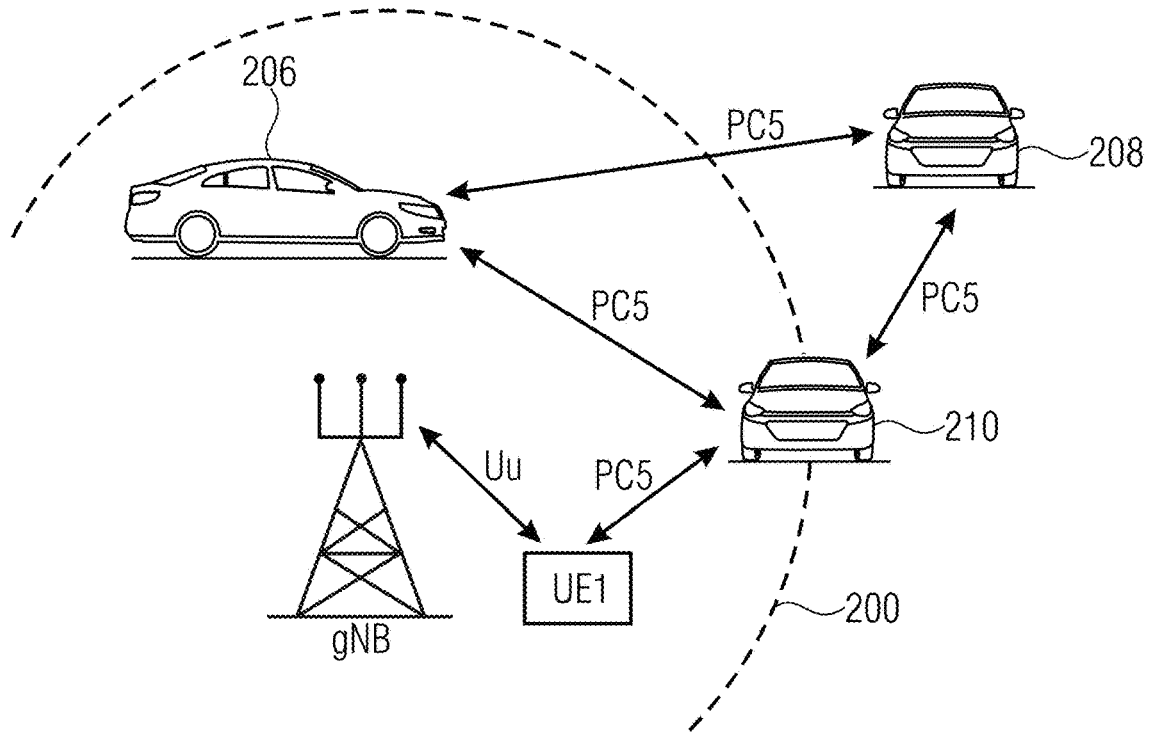
FIG. 3 is a schematic representation of an out-of-coverage scenario in which the UEs directly communicating with each other.
Figure 4:
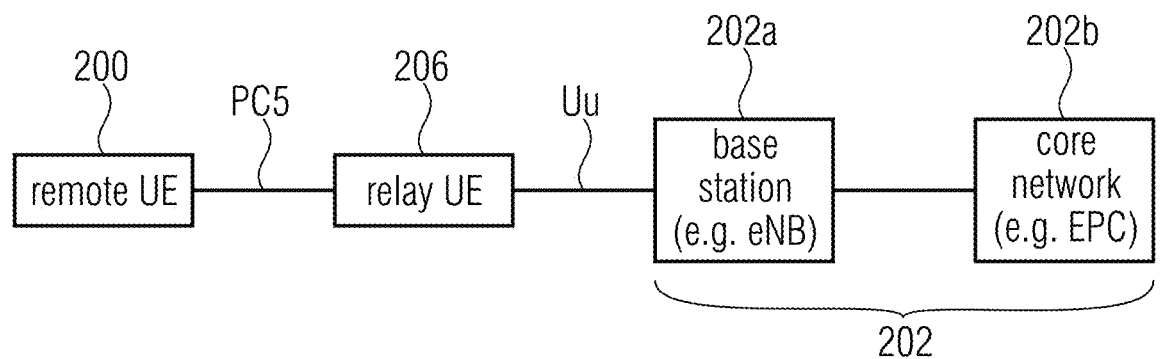
FIG. 4 illustrates a scenario where a relay UE operates as a UE-to-Network relay.
Figure 5:
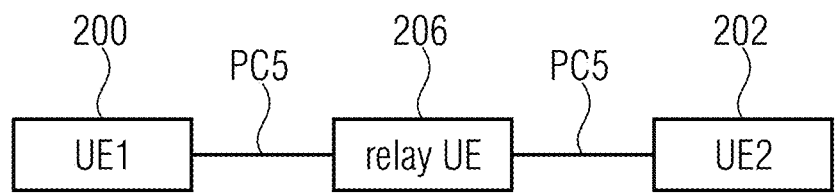
FIG. 5 illustrates a scenario where the relay is a UE-to-UE relay.
Figure 6:
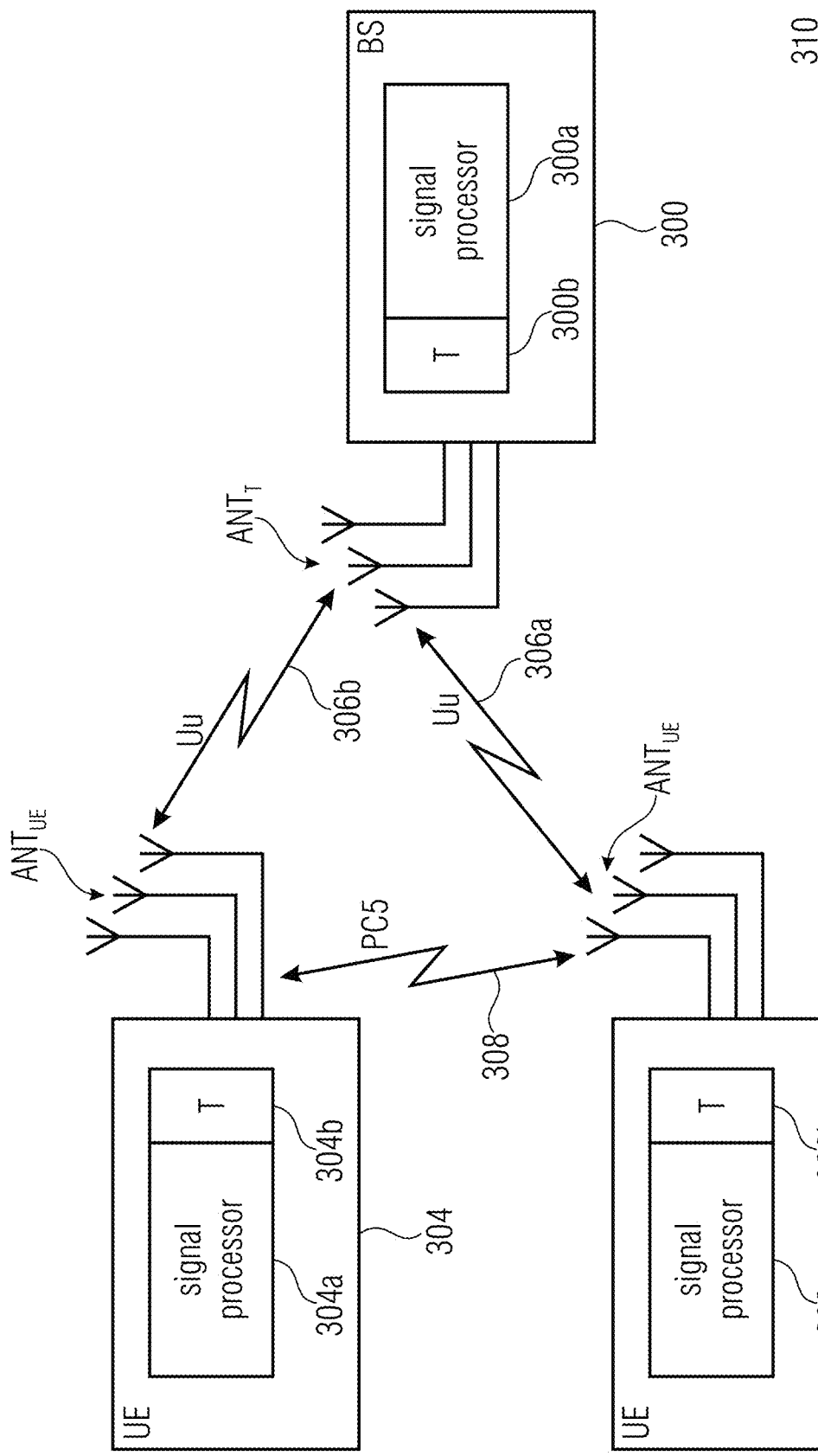
FIG. 6 is a schematic representation of a wireless communication system including a transmitter, like a base station, and one or more receivers, like user devices, UEs capable of operating in accordance with embodiments of the present invention.

The present invention provides approaches for obtaining reliably resources for a transmission over a sidelink by a UE operating in the DRX mode and being out-of-coverage. Embodiments of the present invention may be implemented in a wireless communication system as depicted in FIG. 1, FIG. 2 or FIG. 3 including base stations and users, like mobile terminals or IoT devices. FIG. 6 is a schematic representation of a wireless communication system including a transmitter 300, like a base station, and one or more receivers 302, 304, like user devices, UEs. The transmitter 300 and the receivers 302, 304 may communicate via one or more wireless communication links or channels 306a, 306b,

308, like a radio link. The transmitter 300 may include one or more antennas $ANT_T$ or an antenna array having a plurality of antenna elements, a signal processor 300a and a transceiver 300b, coupled with each other. The receivers 302, 304 include one or more antennas $ANT_{UE}$ or an antenna array having a plurality of antennas, a signal processor 302a, 304a, and a transceiver 302b, 304b coupled with each other. The base station 300 and the UEs 302, 304 may communicate via respective first wireless communication links 306a and 306b, like a radio link using the Uu interface, while the UEs 302, 304 may communicate with each other via a second wireless communication link 308, like a radio link using the PC5 or sidelink, SL, interface. When the UEs are not served by the base station, are not be connected to a base station, for example, they are not in an RRC connected state, or, more generally, when no SL resource allocation configuration or assistance is provided by a base station, the UEs may communicate with each other over the sidelink. The system or network of FIG. 6, the one or more UEs 302, 304 of FIG. 6, and the base station 300 of FIG. 6 may operate in accordance with the inventive teachings described herein.

User Device Obtaining Resources Via Assistance Information Message or Sensing

The present invention provides a user device, UE, for a wireless communication system, the wireless communication system including a plurality of user devices, UEs,
  wherein the UE is to communicate with one or more further UEs using a sidelink, SL,
  wherein the UE is to operate in a Discontinuous Reception, DRX, mode, and
  wherein, when being out-of-coverage, the UE is to obtain one or more resources available for a transmission
    from an assistance information message, AIM, received from one or more of the further UEs during an ON duration of one or more DRX cycles, and/or
    from an assistance information message, AIM, received from one or more of the further UEs during a listening duration, and/or
    by carrying out sensing in a set of sidelink resources or in a sidelink resource pool of the wireless communication system during an ON duration of one or more DRX cycles, and/or
    by carrying out sensing in a set of sidelink resources or in a sidelink resource pool of the wireless communication system during a listening duration.

In accordance with embodiment, the UE is to obtain the one or more resources available for a transmission from the AIM and from the sensing results.

In accordance with embodiment, the UE is to obtain the one or more resources available for a transmission from the AIM and from the sensing results, the UE is to
  favor the sensing results over the resources in the AIM, e.g., by overriding resources in the AIM by the sensing results, or
  favor the resources in the AIM over the sensing results, e.g., by overriding the sensing results by resources in the AIM, or
  use a combination of the resources indicated in the AIM as well as the resources indicated in the sensing results, or
  use one among a plurality of AIMs.

In accordance with embodiment, the UE is to obtain the one or more resources available for a transmission from the sensing results and not from the AIM when one or more of the following are true
  the RSRP threshold used by the UE to carry out sensing is linked to a higher priority than the priority of the AIM,
  the validity of the AIM has expired when the UE has obtained the sensing results.

In accordance with the embodiment, the UE is to obtain the one or more resources available for a transmission from the AIM and not from the sensing results when one or more of the following are true
  the priority of the AIM is higher than priority linked to the RSRP threshold used by the UE to carry out sensing,
  the sensing results are outdated when the AIM is received.

In accordance with embodiment, the UE is to obtain the one or more resources available for a transmission from a combination of the AIM and from the sensing results, and the UE is to
  use the sensing results in case the AIM contains only resources that the UE is not to use, e.g., by eliminating the resources indicated in the AIM from the resources obtained by sensing, or
  consider only resources commonly indicated in the AIM and by the sensing results, or.
  consider only resources commonly indicated in the AIM and by the sensing results, wherein among these resources, the UE may select resources having a certain reliability, e.g., a reliability exceeding a certain threshold such as the RSRP threshold.

In accordance with embodiment, when the UE receives multiple AIMs, the UE is to
  favor the resources in a first AIM having a first priority over the resources in a second AIM having a second priority lower than the first priority, e.g., by overriding the resources in the second AIM by resources in the first AIM, or
  use an AIM with a higher priority to override another AIM with a lower priority.

- - - Assistance Information Message - - -

In accordance with embodiment, the AIM includes resources for the UE to use for a transmission of the UE's own control, like the PSCCH, and/or the UE's own data, like the PSSCH, and/or the UE's feedback, like the PSFCH.

In accordance with embodiment, the resources available for a transmission included in the AIM depend on a type of the UE.

In accordance with embodiment, when the UE obtains resources available for a transmission from an AIM, the UE is not to carry out any type of sensing and rely on one or more of the further UEs in the UE's vicinity to carry out sensing and select resources available for a transmission by the UE.

In accordance with embodiment, the DRX configuration or the DRX pre-configuration informs the UE to not carry out sensing for the determination of resources for a transmission, but to use resources indicated in one or more AIMs to be received from one or more of the further UEs in the UE's vicinity instead.

In accordance with embodiment, the UE is to receive the AIM as a control packet, e.g., via a PC5 RRC signaling, or as a MAC CE signaling, or as a data packet from the one or more of the further UEs, or as an information block, e.g., a sidelink information block, SLIB.

In accordance with embodiment, the UE is to receive an updated DRX configuration including the AIM.

In accordance with embodiment, the updated DRX configuration informs the UE to not carry out sensing for the determination of resources available for a transmission, but to use resources indicated in one or more AIMs to be received from one or more of the further UEs in the UE's vicinity instead.

In accordance with embodiment, the AIM includes an explicit parameter indicating that the UE is not to carry out sensing for the transmissions in any resources, or that the UE is not to carry out sensing for the transmissions in one or more resources or resource sets.

In accordance with embodiment, the UE is to receive the AIM for one of more data packets to be transmitted, and to use the resources indicated in the AIM for the transmission of the data packet for which the AIM was received.

In accordance with embodiment, a control message, like a SCI or a MAC CE, accompanying the AIM indicates that the UE is not to carry out sensing for the transmissions of the one of more data packets in any resources, or that the UE is not to carry out sensing for the transmissions in one or more resources or resource sets.

In accordance with embodiment, the UE receives AIMs from different one of the further UEs, the UE is to select resources for a transmission by one or more criteria, like a hierarchy of the AIM sources, and/or a priority associated with the AIMs, and/or resources found in some or all of the AIMs.

In accordance with embodiment, the UE is to request the one or more AIMs.

In accordance with embodiment, the UE is to request the one or more AIMs, e.g., when the UE
- needs assistance in the resource allocation procedure, and/or
- has selected a certain DRX-configuration, and/or
- the power status of the UE is below a configured and/or pre-configured threshold.

In accordance with embodiment, the UE needs assistance in the resource allocation procedure in one or more of the following cases:
- a transmission of one or more packets needs a high reliability and/or a low latency,
- inadequate or no sensing results are available at the UE, e.g., in case of a change of resource pools,
- the UE's power level is below a configured and/or pre-configured threshold,
- the UE wants improve its power consumption by reducing sensing efforts and limit sensing to a configured and/or pre-configured set of resources/resource pools.

- - - Sensing during ON Duration - - -

In accordance with embodiment, the UE obtains resources available for a transmission by carrying out sensing during an ON duration of one or more DRX cycles.

In accordance with embodiment, the UE is to switch from currently used DRX cycles, like long DRX cycles, to new DRX cycles, like short DRX cycles, the new DRX cycles having successive ON durations that are spaced by a time period, e.g., the OFF duration, that is shorter than a time period by which the ON durations of the currently used DRX cycles are spaced.

In accordance with embodiment, the UE is to switch to the new DRX cycles in case, during a certain sensing window, insufficient sensing results are obtained, like a number of sensing results being below a threshold, or a confidence value associated with the sensing results being below a threshold.

In accordance with embodiment, the DRX configuration of the currently used DRX cycle includes the threshold to decide the insufficiency of the resources obtained from sensing, falling below which the UE is to switch to the new DRX cycles, wherein the DRX configurations of the new DRX cycles are also included.

In accordance with embodiment, the UE is to switch back from the new DRX cycles to the currently used DRX cycles in case, during a certain sensing window, the sensing results indicate a sufficient number of available resources.

In accordance with embodiment, the UE is to carry out sensing during a plurality of ON durations only when an interval between successive ON durations is below a certain threshold, like during short DRX cycles.

In accordance with embodiment, responsive to a regular DRX cycle configuration, the UE is expected to carry out sensing whenever it is in the ON duration.

- - - Sensing During Listening Duration - - -

In accordance with embodiment, the listening duration comprises one or more of:
- one listening duration preceding the ON duration, the one listening duration being consecutive with the ON duration or being offset from the ON duration by a certain time,
- one listening duration following the ON duration, the one listening duration being consecutive with the ON duration or being offset from the ON duration by a certain time,
- a plurality of listening durations preceding the ON duration, the respective listening durations being offset from each other by a certain time,
- a plurality of listening durations following the ON duration, the respective listening durations being offset from each other by a certain time
- an ON duration of the DRX cycle during which the UE is to listen only to control messages and the one or more AIMs, e.g., similar to a "light" DRX cycle.

In accordance with embodiment, when the UE obtains resources available for a transmission by carrying out sensing during the listening duration, the UE is to carry out only sensing or receiving of AIMs during the listening duration and is not to transmit or decode any control and/or data during the listening duration.

In accordance with embodiment, the UE is to carry out sensing during the listening duration and during at least a part of the ON duration, e.g., responsive to a regular DRX cycle configuration indicating the listening duration.

User Device Providing Assistance Information Message

The present invention provides a user device, UE, for a wireless communication system, the wireless communication system including a plurality of user devices, UEs,
- wherein the UE is to communicate with one or more further UEs using a sidelink, SL,
- wherein the UE is to carry out sensing in a SL resource pool and to determine resources available for a transmission, or obtains the resources from a base station of the wireless communication system directly or indirectly, e.g., via a relay, and
- wherein the UE is to transmit the determined resources available for a transmission, e.g., using an assistance information message, AIM.

In accordance with embodiment,
- the UE and one or more of the further UEs form a UE group, and
- the UE is to assist one or more of the other group members by providing the one or more AIMs such that one or more of the other group members
  - need not carry out sensing, or
  - reduce the ON duration, or
  - disable the ON duration and enable the listening duration, or
  - reduce the listening duration.

General

In accordance with embodiment, when being out-of-coverage, the UE
- is not connected to a base station of the wireless communication system, e.g., the UE operates in Mode 2 or is not in an RRC connected state, so that the UE does not receive from the base station a sidelink resource allocation configuration or assistance, and/or
- is connected to a base station of the wireless communication system, which, for one or more reasons, is not capable to provide a sidelink resource allocation configuration or assistance for the UE, and/or
- is connected to a base station of the wireless communication system not supporting a sidelink service, like a NR V2X service, e.g., a GSM, UMTS or LTE base station.

In accordance with embodiment, the UE comprise one or more of a power-limited UE, or a hand-held UE, like a UE used by a pedestrian, and referred to as a Vulnerable Road User, VRU, or a Pedestrian UE, P-UE, or an on-body or hand-held UE used by public safety personnel and first responders, and referred to as Public safety UE, PS-UE, or an IoT UE, e.g., a sensor, an actuator or a UE provided in a campus network to carry out repetitive tasks and needing input from a gateway node at periodic intervals, or a mobile terminal, or a stationary terminal, or a cellular IoT-UE, or a vehicular UE, or a vehicular group leader (GL) UE, or an IoT or narrowband IoT, NB-IoT, device, or a ground based vehicle, or an aerial vehicle, or a drone, or a moving base station, or road side unit (RSU), or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity.

System

The present invention provides a wireless communication system, comprising a plurality of the inventive user devices, UEs, and configured for a sidelink communication using, for example resources from a set of sidelink resources of the wireless communication system.

In accordance with embodiment, the wireless communication system comprises one or more base stations, wherein the base station comprises one or more of a macro cell base station, or a small cell base station, or a central unit of a base station, or a distributed unit of a base station, or a road side unit (RSU), or a UE, or a group leader (GL), or a relay or a remote radio head, or an AMF, or an SMF, or a core network entity, or mobile edge computing (MEC) entity, or a network slice as in the NR or 5G core context, or any transmission/reception point, TRP, enabling an item or a device to communicate using the wireless communication network, the item or device being provided with network connectivity to communicate using the wireless communication network.

Methods

The present invention provides a method for operating a user device, UE, of a wireless communication system including a plurality of user devices, UEs, the method comprising:
- operating the UE to communicate with one or more further UEs using a sidelink, SL,
- operating the UE in a Discontinuous Reception, DRX, mode, and
- when being out-of-coverage, obtaining, by the UE, one or more resources available for a transmission
  - from an assistance information message, AIM, received from one or more of the further UEs during an ON duration of one or more DRX cycles, and/or
  - from an assistance information message, AIM, received from one or more of the further UEs during a listening duration, and/or
  - by carrying out sensing in a set of sidelink resources or in a sidelink resource pool of the wireless communication system during an ON duration of one or more DRX cycles, and/or
  - by carrying out sensing in a set of sidelink resources or in a sidelink resource pool of the wireless communication system during a listening duration.

The present invention provides a method for operating a user device, UE, of a wireless communication system including a plurality of user devices, UEs, the method comprising:
- operating the UE to communicate with one or more further UEs using a sidelink, SL,
- carrying out sensing, by the UE, in a SL resource pool and to determine resources available for a transmission, or obtains the resources from a base station of the wireless communication system directly or indirectly, e.g., via a relay, and
- transmitting, by the UE, the determined resources available for a transmission, e.g., using an assistance information message, AIM.

Computer Program Product

Embodiments of the present invention provide a computer program product comprising instructions which, when the program is executed by a computer, causes the computer to carry out one or more methods in accordance with the present invention.

Embodiments of the present invention provide approaches for allowing for a reliable determination of resources to be used for a transmission over the sidelink at a UE operating in the DRX mode. The inventive approach is applicable to each UE communicating over the sidelink and operating in the DRX mode that, when being out-of-coverage, needs to obtain reliable resources for a communication, like a transmission, over the sidelink.

Embodiments concern the following types of UEs communicating over a sidelink PC5:
- Vulnerable road users, VRUs, like pedestrian UEs, P-UEs: these UEs are basically hand-held UEs used by pedestrians, like mobile phones. The UE may transmit its location periodically to vehicular UEs, V-UEs, so that these V-UEs are aware of the UE's location. The V-UEs may receive a transmission from the UE in case they are in proximity and that there is a possibility of a collision.
- Public safety UEs, PS-UEs: such UEs may be on-body or hand-held UEs used by public safety personnel and first responders, like policemen, paramedics and firemen. The PS-UEs need both transmit and receive functionality at all times.
- IoT-UEs: these UEs may include sensors in a sensor network, actuators or other low power nodes or powered relay and/or processing nodes.
- Industrial IoT-UEs: these UEs may be devices in a closed campus network designed to carry out certain tasks and obtaining inputs from a gateway node at periodic intervals. Examples for IoT-UEs are robots on a factory floor carrying out repetitive tasks.

A UE communicating over the sidelink and operating in the DRX mode, for example, a UE as described above, needs to select reliable resources for a transmission of data when being out-of-coverage, for example, when operating in Mode 2. In accordance with embodiments of the present invention, the UE is given one or more resources available for a transmission, or carries out sensing for one or more resources available for a transmission, in a way that is coupled with the DRX cycle so as to allow the UEs to obtain reliable resources in a power efficient way and that avoids the UE to remain ON all the time for obtaining the reliable resources that the SL transmission of data needs. In this description, the one or more resources available for a transmission are also referred to as candidate resources or as a set of candidate resources.

- - - Assistance Information - - -

In accordance with embodiments, the resource allocation for an out-of-coverage UE communicating over the sidelink may employ so-called assistance information. An out-of-coverage UE, like a UE operating in Mode 2, which is not assisted by the gNB, may receive assistance information from another UE within its vicinity. The assistance information may be sent from the other UE either via a control message, for example, using PC5 RRC signaling or a MAC CE, or it may be transmitted as a data packet. The assistance information may be sent using an assistance information message, AIM. The AIM may include a set of resources for the UE, that may be used by the given UE for the transmission of one or more of the UE's own control messages, like the PSCCH,
the UE's own data, like the PSSCH,
the UE's feedback, like the PSFCH. The UE may be polled to provide feedback on a pre-defined resource, e.g., to send its geo position on a 2nd stage SCI or to provide CSI feedback on the PSFCH.

For example, when considering the above-mentioned P-UEs, such a P-UE needs resources for transmitting its location to make other vehicular UEs, V-UEs, aware of its presence. On the other hand, for the above-mentioned PS-UEs or IoT-UEs, the AIM may contain resources for a data transmission based on the UE type. For example, the PS-UEs and the IoT-UEs may have predefined message types and sizes, and the UE sensing the AIMs is aware of this and, accordingly, senses suitable resources for the PS-UE or the IoT-UE that allow for a reliable transmission of such messages.

The AIM may be transmitted by the one or more other UEs during the ON duration or a listening duration of an implemented DRX cycle. Thus, in case of active DRX cycles, the UE may receive the resource allocation information in the AIM from the one or more other UEs providing the AIM. For example, the P-UEs may receive the AIM at the beginning of an ON duration and use the resource allocation information included in the received AIM to broadcast its location information during the remaining part of the ON duration or any subsequent ON duration, as indicated by the AIM, so that it may be received by V-UEs being in proximity to the PS-UE. Following the transmission, the PS-UE may return to the OFF duration. In other words, in accordance with embodiments of the present invention employing the AIM, rather than carrying out sensing by its own, a UE, during an ON duration of one or more DRX cycles may receive the AIM and, thereby, the resources for a transmission over the sidelink.

Figure 7:
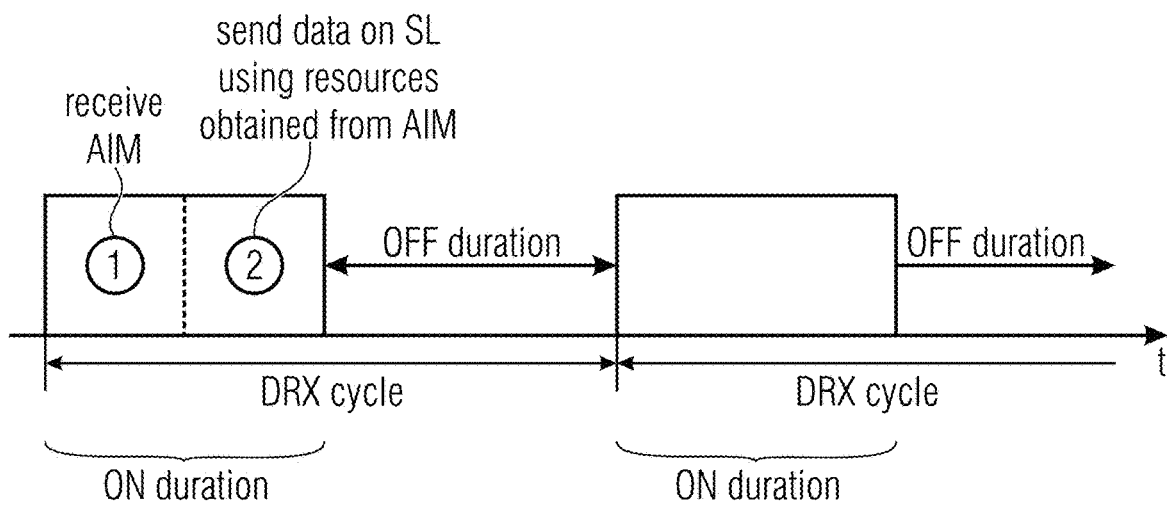
FIG. 7 illustrates an embodiment of a resource allocation via assistance information in accordance with the present invention.

FIG. 7 illustrates an embodiment of a resource allocation via assistance information in accordance with the present invention. FIG. 7 illustrates a DRX cycle as it may be employed by a SL UE. As is illustrated, the DRX cycle includes the ON duration and the OFF duration. During the OFF duration, the UE is not active and does not receive or transmit. Only during the ON duration the UE is active, and in accordance with embodiments of the present invention, during the ON duration the UE receives ① the AIM, derives the resource information for a transmission from the AIM and sends ② data using the resources the UE obtained from the AIM. It is noted that the DRX cycle may be a short DRX cycle or a long DRX cycle. In a short DRX cycle, the interval or OFF duration between subsequent ON durations is shorter than in a long DRX cycle. For example, the ON durations in the short DRX cycle and in the long DRX cycle may span the same time, for example two or more consecutive sub-frames or symbols, however, the OFF duration between subsequent ON durations is shorter in the short DRX cycle, for example, only three sub-frames when compared to the long DRX cycle in which the OFF duration between subsequent ON durations is, for example, seven sub-frames. In accordance with other embodiments, the DRX cycle may have a duration of one or more time slots, each spanning twelve or fourteen orthogonal frequency multiplexing, OFDM, symbols, and a long DRX cycle may include an ON duration, for example, at the beginning of the time slot and spanning one or more of the symbols, while a short DRX cycle may include within the time slot multiple ON durations.

Figure 8:
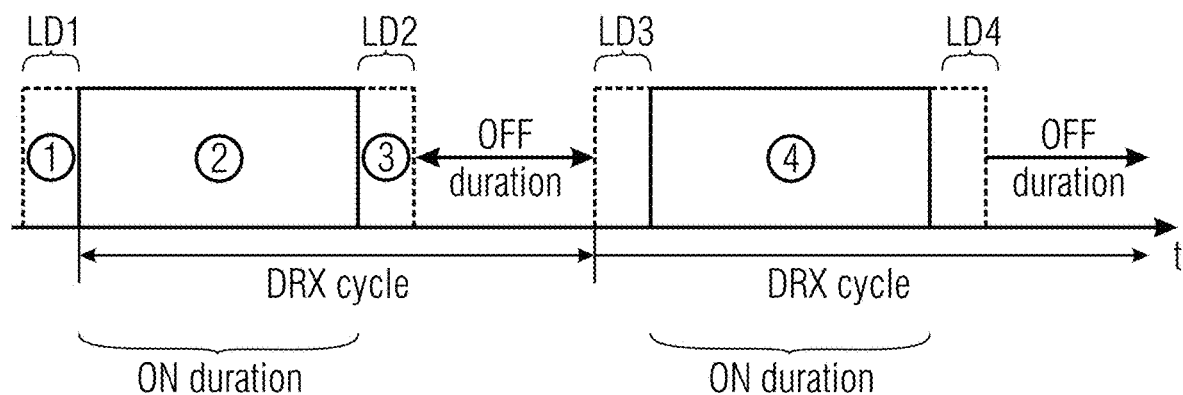
FIG. 8 illustrates an embodiment employing the additional listening duration for receiving the AIM at a sidelink UE operating in the DRX mode.

In accordance with further embodiments employing the assistance information for the resource allocation in a SL UE operating in the DRX mode, the ON duration of a DRX cycle may be extended by a so-called listening duration. In accordance with embodiments, the listening duration is either provided at the beginning of the regular ON duration and/or the end of the regular ON duration. During the additional listening duration the UE is to receive the AIM. FIG. 8 illustrates an embodiment employing the additional listening duration for receiving the AIM at a sidelink UE operating in the DRX mode. FIG. 8 illustrates a DRX cycle including an ON duration extended at its beginning by a first listen duration LD1 and at its end by a second listening duration LD2. During the listening durations, the UE is only to listen, i.e., the UE is not to perform any transmissions. Furthermore, during the listening duration, the UE may perform only power sensing but no decoding of control and data or it may perform decoding of control only for sensing or wake-up purposes but no data decoding. In the embodiment depicted in FIG. 8, it is assumed that the UE receives ① the AIM during the first listening duration LD1 so that it may employ the resources obtained from the AIM for a transmission ② during the actual ON duration of the DRX cycle. FIG. 8 illustrates another embodiment in accordance with which the AIM is received ③ at the second listening duration LD2 following the ON duration so that the data is transmitted ④ only in the ON duration of the following DRX cycle.

It is noted that FIG. 8 only illustrates an embodiment in accordance with which the listening durations are provided at the beginning and at the end of the ON duration, however, in accordance with other embodiments a listening duration may be provided only at the beginning or only at the end of the ON duration. However, the present invention is not limited to one listening duration preceding and/or following the ON duration such that the one listening duration is consecutive with the ON duration.

In accordance with further embodiments, the one listening duration preceding and/or following the ON duration may be offset from the ON duration by a certain time, as is illustrated in FIG. 9(a). DRX Cycle 1 includes one listening duration LD1 preceding the ON duration and being offset form the ON duration by the time Δt1. DRX Cycle 2 includes one listening duration LD2 following the ON duration and being offset from the ON duration by the time Δt2. DRX Cycle 3 includes one listening duration LD1 preceding the ON duration and being offset from the ON duration by the time Δt3, and one listening duration LD2 following the ON duration and being offset form the ON duration by the time Δt4. It is noted that, in accordance with embodiments, in DRX cycle 3 the time Δt3 or the time Δt4 may be zero, i.e., the listening duration LD1 or the listening duration LD2 may be consecutive with the ON duration. In accordance with embodiments, the times Δt1, Δt2, Δt3, Δt4 may be the same or may be different.

In accordance with yet further embodiments, more than one listening duration preceding and/or following the ON duration may be provided, as is illustrated in FIG. 9(b). DRX Cycle 1 includes a plurality of listening durations LD1 preceding the ON duration, which are offset from each other by the same time or by different time intervals. DRX Cycle 2 includes a plurality of listening durations LD2 following the ON duration, which are offset from each other by the same time or by different time intervals. DRX Cycle 3 includes a plurality of listening durations LD1 preceding the ON duration, which are offset from each other by the same time or by different time intervals, and a plurality of listening durations LD2 following the ON duration, which are offset from each other by the same time or by different time intervals.

It is noted that also any combination of the above-described listening durations may be implemented.

The listening duration is used by the UE to receive one or more AIMs. The UE is not expected to not transmit any packets or to decode any received packets. As described above, the listening duration may be before or after any ON duration, as illustrated in FIG. 8 and FIG. 9.

In accordance with other embodiments, the listening duration may be an ON duration of the DRX cycle during which the UE is to listen only for the one or more AIMs. This is also referred to as a standalone listening duration or as a light DRX cycle. The standalone listening duration may be referred to as a DRX lite mode, where the ON duration as defined for the normal DRX operation is used by the UE only for listening for the one or more AIMs so as to obtain resources for a future transmission, but not for transmitting any data and/or receiving any further data.

Figure 10A:
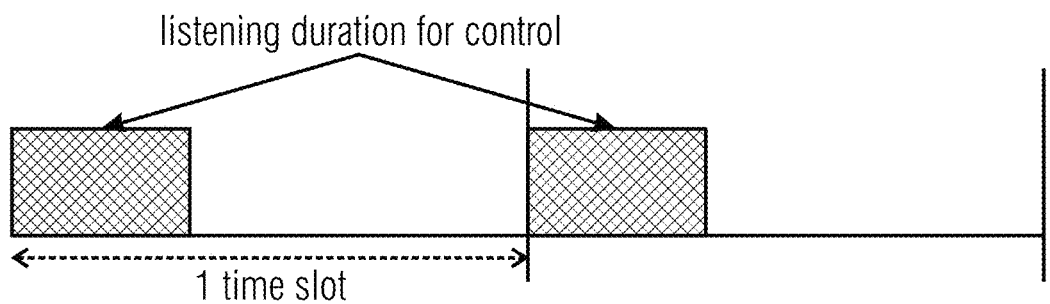
FIG. 10a-b illustrates periodic listening durations in accordance with embodiments of the present invention.
Figure 10B:
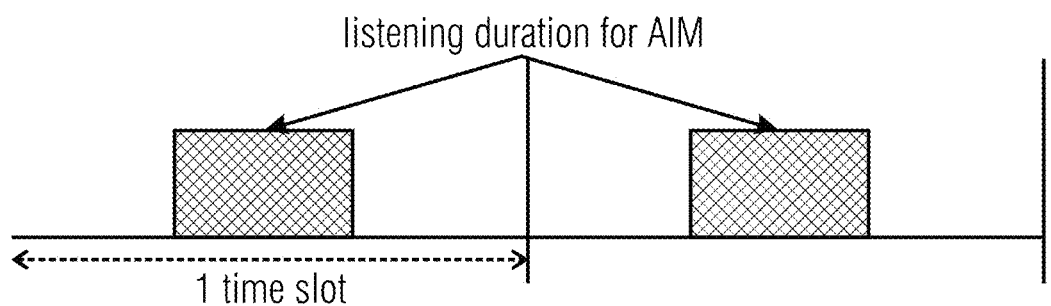

In accordance with embodiments, the listening duration may be periodic across time, and the listening duration may be restricted to only the beginning of a time slot where the one or more AIMs are transmitted, as is shown in FIG. 10(a) illustrating a periodic listening duration for the one or more AIMs. In accordance with further embodiments, the listening duration may be periodic based on a configuration of the AIM. The configuration of the AIM may be received at the UE in a SIB or MIB. The AIM may then be send as an information block, like a sidelink information block, SLIB, and the periodicity of the SLIB is defined in the SIB or MIB. FIG. 10(b) illustrates periodic listening durations for AIMs transmitted as SLIBs.

In accordance with embodiments, the UE may receive the assistance information or AIM as
 a control packet, e.g., via a PC5 RRC signaling, or as a MAC CE signaling, or
 a data packet from the one or more of the further UEs, or an information block, e.g., by means of the above mentioned sidelink information block, SLIB.

In accordance with embodiments the UE may receive the assistance information in the form of a configuration, and the UE may use the configuration for the transmission of a plurality of packets, like for all packets within a predefined time period during which the configuration is valid. For example, the configuration may be valid for all data packets after 100 ms, or may be valid for all data packets after the UE has entered a specific geographical area. In accordance with other embodiments, the assistance information may be received for one or more packets to be transmitted, and is to be used by the UE only for the transmission of these one or more packets.

In accordance with further embodiments, a UE may receive a plurality of AIMs from one or more of the other UEs, and in case the AIMs include different resources, i.e., in case of conflicting AIMs, the UE may select the resources to be used for a transmission by one or more of the following criteria:
 a hierarchy of the source of the AIM,
 a priority indication in the AIM,
 common resources found within the conflicting AIMs.

In accordance with embodiments, the UE operating in the DRX mode according to a current DRX configuration, may receive during an ON duration a new or updated DRX configuration to be used. In accordance with embodiments, the updated DRX configuration may include the AIM. The updated DRX configuration may also inform the UE to not carry out sensing for all or only a particular transmission. This restriction can also be time-bound, e.g., where the UE does not carry out sensing for a defined period of time, after which the UE is expected to carry out sensing. For example, the new or updated DRX configuration may include details of the AIM indicating resources to be used by the UE for all transmissions or only for a particular transmission.

In accordance with embodiments, the UE may receive a DRX configuration or is pre-configured with a DRX configuration that explicitly requests the UE to not carry out sensing for the determination of resources for a transmission, but to use the resources indicated in the AIMs that the UE receives from other UEs in the vicinity of the UE. This restriction can also be time-bound, e.g., where the UE does not carry out sensing for a defined period of time, after which the UE is expected to carry out sensing.

In accordance with embodiments, employing the AIM may avoid the UE from carrying out any type of sensing at all, e.g., the UE is not to carry out sensing in any resources, which reduces the burden on the UE and thus improve its power status in terms of battery lifetime. In accordance with other embodiments, the AIM or a control message, like a SCI or a MAC CE, accompanying the AIM indicates that the UE is not to carry out sensing for the transmissions in one or more resources or resource sets, like
 one or more resource pools, RPs, e.g., transmit, receive or exceptional resource pools, or
 one or more bandwidth parts, BWPs, or
 one or more frequency entities, or
 one or more time entities, e.g., OFDM symbols or slots or subframes or radioframes etc.

The frequency entities may be indicated in any one of the following manners:
 by a bitmap, the bitmap the bitmap indicating resources, like resource blocks, across the one BWP,
 by a starting resource, like a resource block, and a number of resources for a resource set,
 by multiple starting resources, like resource blocks, and ending resources, if the resource set is non-contiguous over frequency, by explicit resource indices, like resource block indices,
by puncturing out resources mentioned explicitly or that are part of another set of resources or RP,
by a starting resource, and periodic offsets for subsequent occurrences,
by a pattern of resource blocks or subchannels, The time entities may be indicated in any one of the following manners:

by a bitmap across time, the bitmap indicating resources, like OFDM symbols or time slots or subframes or frames, where the resource set is defined, spanning either a portion or the entire length of the one BWP,
by a starting resource, like a time slot or a subframe, and a duration of the resource set,
by explicit resources numbers, like time slot or subframe numbers,
by puncturing out resources mentioned explicitly or that are part of another set of resources or RP,
by a starting resource, and periodic offsets for subsequent occurrences,
by a pattern of symbols, time slots or subframes or frames.

In accordance with embodiments, the UE may request the one or more AIMs. For example, the UE may request the one or more AIMs to avoid to perform sensing and thus save power, e.g., when the power status of the UE is below a pre-defined threshold. The UE may transmit its power status to the network or to another UE, which may provide the AIM or inform the UE to perform sensing, for example because the power level is above the pre-defined threshold. In accordance with another embodiment, the UE operating in the DRX mode may transmit the DRX configuration, e.g., identified by a certain bit-sequence, to the network or to another UE, which may provide the AIM. In accordance with yet further embodiments, the UE may request the one or more AIMs when the UE needs assistance in the resource allocation procedure, for example in case a transmission of one or more packets needs a high reliability and/or a low latency and/or high priority,
inadequate or no sensing results are available at the UE, e.g., in case of a change of resource pools,
the UE's power level is below a pre-defined threshold,
the UE wants improve its power consumption by reducing sensing efforts and limit sensing to a pre-defined set of resources/resource pools.

- - - Sensing During the ON Duration - - -

In accordance with further embodiments of the present invention, an out-of-coverage UE using DRX, like a Mode 2 UE, carries out sensing during the ON duration of the DRX cycle, for example, in a set of sidelink resources, also referred to as a sidelink resource pool, provided by the wireless communication system for the sidelink communication, so as to identify candidate resources that the UE may use for the transmission of data. For example, the UE may carry out sensing during the ON duration of the DRX cycle illustrated in FIG. 7. Instead of receiving the AIM as described above, the UE performs sensing during the one or more ON durations illustrated in FIG. 7 to obtain reliable resources for the transmission over the sidelink. In accordance with embodiments, the resource allocation via sensing for a SL UE operating in the DRX mode may be employed when the UE determines that no AIM is received or that there are no nearby UEs providing such an AIM.

To obtain reasonable or reliable sensing results, the UE needs to carry out sensing over a certain period of time, but only during the ON durations. Carrying out sensing during ON durations having a certain time duration from each other, like in a long DRX cycle, may not be sufficient to identify optimum or reliable resources for the transmission by the UE.

For example, the sensing, in accordance with predefined rule, may be carried out for a certain duration or within a certain sensing window, e.g., during a time period between 100 ms to 1100 ms. During the sensing window, the number of ON durations, when long DRX cycles are used, is lower than the number of ON durations, when short DRX cycles are used. Thus, the number of sensing results may be considered not sufficient for reliably determining whether the resources are available or not. In other words, the confidence in the sensing results may be below a certain threshold. Thus, a DRX mode which, by default, employs a long DRX cycle, may not obtain reliable sensing results. Therefore, in accordance with embodiments the UE, for obtaining resources via sensing, may switch from a long DRX cycle to a short DRX cycle so that more ON durations are available during the sensing window. This allows the UE to obtain reliable or adequate resources for the transmission. A DRX configuration of the currently used DRX cycle may include the threshold to decide the insufficiency of the resources obtained from sensing.

Figure 11A:
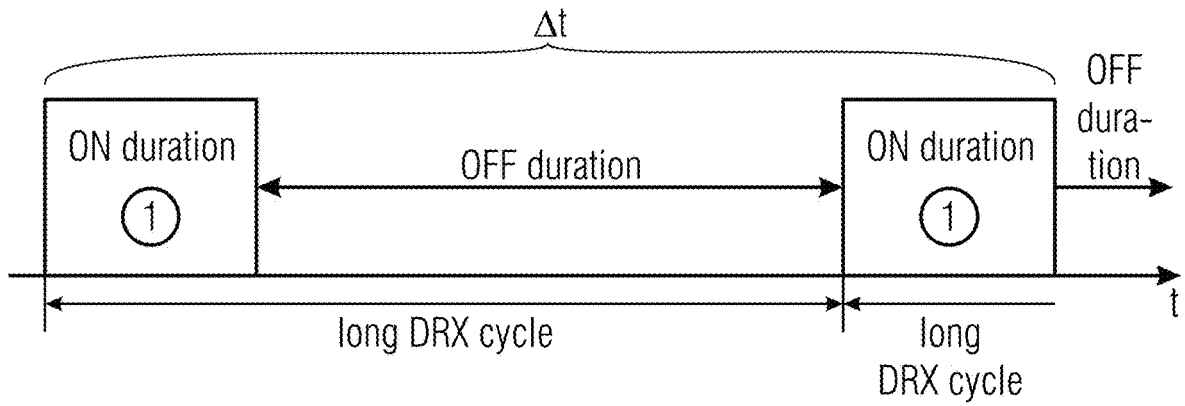
FIG. 11a-b illustrates an embodiment of a SL UE operating in the DRX mode and carrying out sensing in the SL resource pool.
Figure 11B:
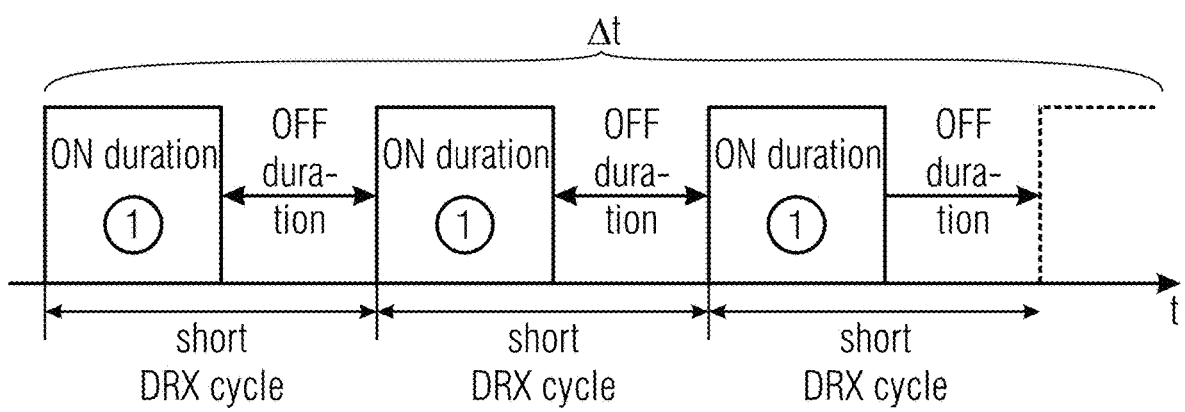

FIG. 11 illustrates an embodiment of a SL UE operating in the DRX mode and carrying out sensing in the SL resource pool. FIG. 11($a$) illustrates a situation in which the UE operates in accordance with a long DRX cycle. Only during the ON durations the UE is capable to listen so as to perform a sensing of available/unavailable resources in the sidelink resource pool. As mentioned above, to obtain reasonable sensing results, the UE is to carry out sensing over an extended period of time, for example, the above-mentioned sensing window having the duration $\Delta t$ as illustrated in FIG. 11($a$). However, when employing a long DRX cycle, the time interval between subsequent ON durations and, thereby between subsequent sensing operations ① is long, so that it is not possible to obtain reliable sensing results. Therefore, as mentioned above, in accordance with embodiments the UE switches to a short DRX cycle as illustrated in FIG. 11($b$), so that during the sensing window $\Delta t$ more ON durations exist during which the sensing ① is performed, thereby obtaining more reliable and reasonable sensing results.

In accordance with further embodiments, in order to obtain tangible sensing results, the UE might to switch to a shorter DRX cycle with frequent ON durations, when the resource pool in which the sensing is performed is congested. In this case, if the UE does not successfully obtain enough resources using the long DRX cycle, it is expected to switch to the short DRX cycle with the more frequent ON durations in order to obtain sensing results. On the other hand, when the resource pool is not congested, the UE is not expected to switch to short DRX cycles as it may use the sensing results obtained during the long DRX cycles to determine resources for a transmission. This may be used only if the UE has indeed obtained enough resources for a transmission using the sensing procedure and while in the long DRX cycle. For example, the UE may determine that is has obtained enough resources if it may build a candidate resource set that has at least 80% of all the available resources. If it does not, it may increase the RSRP threshold by a pre-defined value, e.g., 3 db, and sense again. In this case, the UE may be able to obtain the needed resources.

The UE may switch to the short DRX cycles for a short period of time so more frequent ON durations are available, and, once the UE finished the sensing procedure and obtained the needed resources, it may switch back to the long DRX cycle to save power. For example, the UE may switch back from the short DRX cycles to the long DRX cycles in case, during the sensing window, the sensing results indicate a sufficient number of available resources.

- - - Sensing During the Listening Duration - - -

In accordance with yet further embodiments of the present invention, for example for avoiding the above mentioned problems associated with the use of a long DRX cycle, rather than switching to the short DRX cycle, a modified DRX cycle may be employed in accordance with which the above-mentioned additional duration, referred to as listening duration, LD, is used. In accordance with such embodiments, rather than switching from a long DRX cycle to a short DRX cycle, for providing the UE with sufficient time for carrying out the sensing in the sidelink resource pool for obtaining reasonable sensing results, the ON duration of the DRX cycle, for example, the ON duration of the long DRX cycle, may be extended by one or more listening durations as described in detail above with reference to FIG. 8 to FIG. 10. During the listening duration, the UE carries out sensing only and does not perform the transmission of any data. For example, the UE may carry out the sensing by listening to other UEs and by decoding their control messages, like the SCIs, to ascertain whether resources to be used for a transmission are occupied by the other UEs or not. The listening durations may be enabled for a configurable time before and/or after the ON duration of a DRX cycle, as is illustrated in FIG. 8 to FIG. 10. The listening duration may be an ON duration of the DRX cycle during which the UE is to carry out sensing. This is also referred to as a standalone listening duration. The standalone listening duration may be referred to as a DRX lite mode, where the ON duration as defined for the normal DRX operation is used by the UE for obtaining the sensing results so as to derive resources for a future transmission, but not for transmitting any data.

In accordance with the above-described embodiments obtaining the resources for a sidelink transmission by sensing, the UE is expected to sense and identify resources for the transmission by sensing in the absence of any explicit indication for the UE to not carry out sensing. In case the UE receives a normal DRX configuration, it is expected to carry out sensing whenever it is in the ON duration, and in case the UE receives a DRX configuration including a definition of the listening duration, the UE may carry out sensing in the listening duration or in the listening duration and the ON duration, however, the UE is not to transmit any data in a listening duration.

- - - AIM and Sensing - - -

In accordance with embodiments, the UE may obtain the set of candidate resources for a transmission from the AIM and from the sensing results. For example, the UE may
- favor the sensing results over the resources in the AIM, e.g., by overriding resources in the AIM by the sensing results, or
- favor the resources in the AIM over the sensing results, e.g., by overriding the sensing results by resources in the AIM, or
- use a combination of the resources indicated in the AIM as well as the resources indicated in the sensing results, or
- use one among a plurality of AIMs.

In accordance with other embodiments, the UE may to obtain the set of candidate resources for the transmission from the sensing results and not from the AIM when the RSRP threshold used by the UE to carry out sensing is linked to a higher priority than the priority of the AIM, and/or when the validity of the AIM has expired when the UE has obtained the sensing results.

In accordance with yet other embodiments, the UE may to obtain the set of candidate resources for the transmission from the AIM and not from the sensing results when the priority of the AIM is higher than priority linked to the RSRP threshold used by the UE to carry out sensing, and/or when the sensing results are outdated when the AIM is received.

In accordance with further embodiments, the UE may to obtain the set of candidate resources for the transmission from a combination of the AIM and from the sensing results, and the UE may
- use the sensing results in case the AIM contains only resources that the UE is not to use, e.g., by eliminating the resources indicated in the AIM from the resources obtained by sensing, or
- consider only resources commonly indicated in the AIM and by the sensing results, or
- consider only resources commonly indicated in the AIM and by the sensing results, wherein among these resources, the UE may select resources having a certain reliability, e.g., a reliability exceeding a certain threshold such as the RSRP threshold.

In accordance with other embodiments, when the UE receives multiple AIMs, the UE may
- favor the resources in a first AIM having a first priority over the resources in a second. AIM having a second priority lower than the first priority, e.g., by overriding the resources in the second AIM by resources in the first AIM, or
- use an AIM with a higher priority to override another AIM with a lower priority.

- - - UE Providing AIM - - -

Further embodiments of the present invention provide a SL UE that communicates with one or more further UEs using the sidelink, SL and that obtains the resources from a SL RP. For example, the UE may determine the set of resources by sensing, e.g., in case the UE is out-of-coverage, or the UE may determine the set of resources from resources provided to the UE by a base station of the wireless communication system directly, e.g., in case the UE is in Mode 1 or in-coverage, or indirectly via a relay, e.g., in case the UE is in Mode 2 or in- or out-of-coverage. The UE transmits the determined resources available for a transmission to one or more further UEs, e.g., using the assistance information message, AIM.

In accordance with embodiments, the UE and one or more of the further UEs form a UE group, and the UE is to assist one or more of the other group members by providing the one or more AIMs such that one or more of the other group members
- need not carry out sensing, or
- may reduce the ON duration, or
- disable the ON duration and enable the listening duration, or
- reduce the listening duration.

General

Embodiments of the present invention have been described in detail above, and the respective embodiments and aspects may be implemented individually or two or more of the embodiments or aspects may be implemented in combination.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, the user device, UE, described herein may be one or more of a power-limited UE, or a hand-held UE, like a UE used by a pedestrian, and referred to as a Vulnerable Road User, VRU, or a Pedestrian UE, P-UE, or an on-body or hand-held UE used by public safety personnel and first responders, and referred to as Public safety UE, PS-UE, or an IoT UE, e.g., a sensor, an actuator or a UE provided in a campus network to carry out repetitive tasks and needing input from a gateway node at periodic intervals, or a mobile terminal, or a stationary terminal, or a cellular IoT-UE, or a vehicular UE, or a vehicular group leader, GL, UE, or an IoT, or a narrowband IoT, NB-IoT, device, or a WiFi non Access Point STAtion, non-AP STA, e.g., 802.11ax or 802.11be, or a ground based vehicle, or an aerial vehicle, or a drone, or a moving base station, or a road side unit, or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity.

The base station, BS, described herein may be implemented as mobile or immobile base station and may be one or more of a macro cell base station, or a small cell base station, or a central unit of a base station, or a distributed unit of a base station, or a road side unit, or a UE, or a group leader, GL, or a relay, or a remote radio head, or an AMF, or an SMF, or a core network entity, or mobile edge computing entity, or a network slice as in the NR or 5G core context, or a WiFi AP STA, e.g., 802.11ax or 802.11be, or any transmission/reception point, TRP, enabling an item or a device to communicate using the wireless communication network, the item or device being provided with network connectivity to communicate using the wireless communication network.

Embodiments of the inventive approach are described for sidelink communications in the context of cellular communication systems, safety communication systems, campus networks. The present invention is not limited to this, rather, in accordance with further embodiments, the inventive approach may be employed in any kind of communication network, e.g., an ad-hoc communication network.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 12:
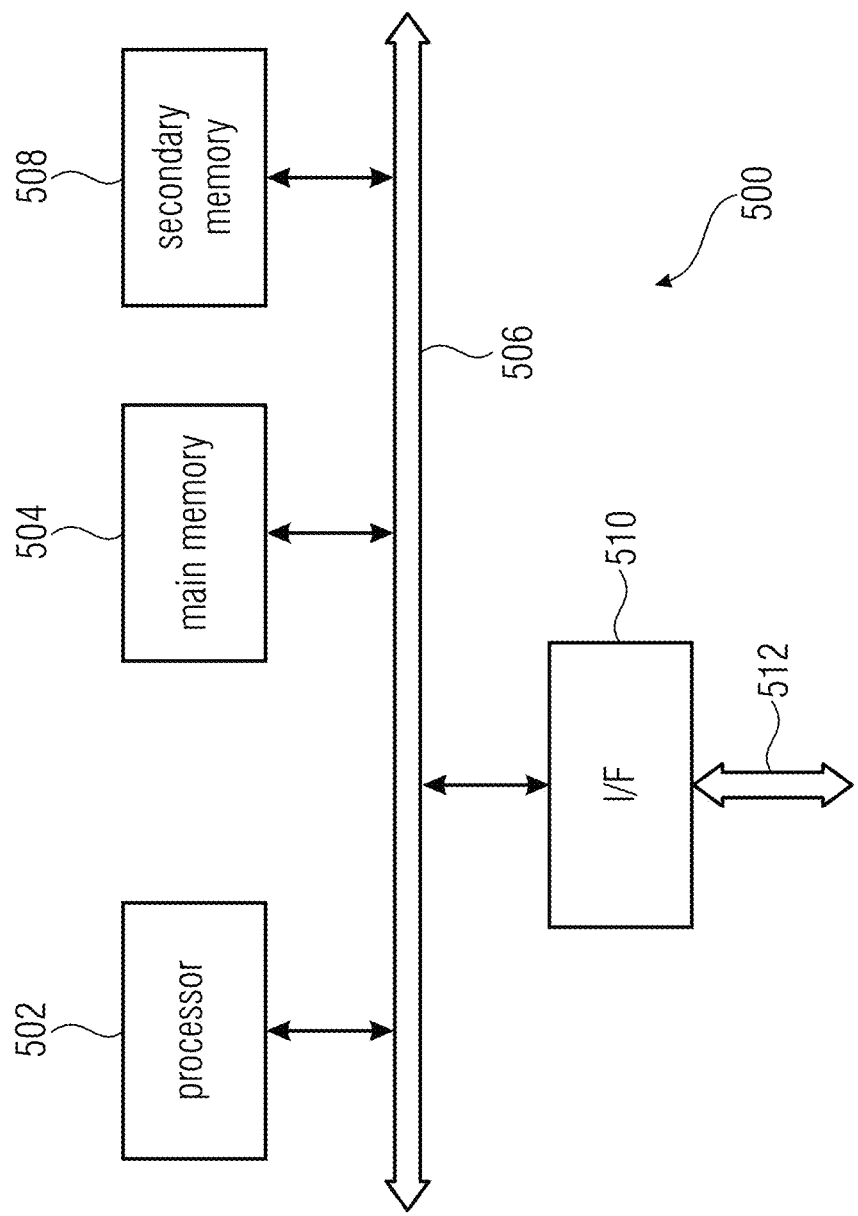
FIG. 12 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 12 illustrates an example of a computer system 500. The units or modules as well as the steps of the methods performed by these units may execute on one or more computer systems 500. The computer system 500 includes one or more processors 502, like a special purpose or a general-purpose digital signal processor. The processor 502 is connected to a communication infrastructure 504, like a bus or a network. The computer system 500 includes a main memory 506, e.g., a random-access memory, RAM, and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the from electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enables the computer system 500 to implement the present invention. In particular, the computer program, when executed, enables processor 502 to implement the processes of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate or are capable of cooperating with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier, or a digital storage medium, or a computer-readable medium comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device, for example a field programmable gate array, may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A user device (UE) for a wireless communication system, the wireless communication system comprising a plurality of user devices (UEs), the UE comprising:
   one or more antennas or an antenna array having a plurality of antenna elements,
   a signal processor, and
   a transceiver,
   wherein the UE is to communicate with one or more further UEs using a sidelink (SL),
   wherein the UE is to operate in a Discontinuous Reception (DRX) mode,
   wherein, when being out-of-coverage, the UE is to acquire one or more resources available for a transmission
      from an assistance information message (AIM), received from the one or more of the further UEs during an ON duration of one or more DRX cycles, and/or
      from an AIM, received from the one or more of the further UEs during a listening duration, and/or
      by carrying out sensing in a set of sidelink resources or in a sidelink resource pool of the wireless communication system during a listening duration
   wherein the listening duration comprises one or more of:
      one listening duration preceding the ON duration, the one listening duration being consecutive with the ON duration or being offset from the ON duration by a certain time,
      one listening duration following the ON duration, the one listening duration being consecutive with the ON duration or being offset from the ON duration by a certain time,
      a plurality of listening durations preceding the ON duration, the respective listening durations being offset from each other by a certain time,
      a plurality of listening durations following the ON duration, the respective listening durations being offset from each other by a certain time, and
   wherein, during the listening duration, the UE is to carry out only sensing or receiving of AIMs and is not to transmit or decode any control information and/or data.

2. The UE of claim 1, wherein the UE is to acquire the one or more resources available for the transmission from the AIM and from the sensing results.

3. The UE of claim 2, wherein, when the UE is to acquire the one or more resources available for the transmission from the AIM and from the sensing results, the UE is to
   favor the sensing results over the resources in the AIM, or
   favor the resources in the AIM over the sensing results, or
   use a combination of the resources indicated in the AIM as well as the resources indicated in the sensing results, or
   use one among a plurality of AIMs.

4. The UE of claim 1, wherein, when the UE acquires resources available for the transmission from the AIM, the UE is not to carry out any type of sensing and rely on one or more of the further UEs in the UE's vicinity to carry out sensing and select resources available for the transmission by the UE.

5. The UE of claim 1, wherein the UE is to receive the AIM as a control packet or as a data packet from the one or more of the further UEs, or as an information block.

6. The UE of claim 1, wherein the UE is to receive the AIM for one of more data packets to be transmitted, and to use the resources indicated in the AIM for the transmission of a data packet for which the AIM was received.

7. The UE of claim 1, wherein the UE is to request the AIM.

8. The UE of claim 7, wherein the UE is to request the AIM when the UE
   needs assistance in the resource allocation procedure, and/or
   has selected a certain DRX-configuration, and/or
   the power status of the UE is below a configured and/or pre-configured threshold.

9. The UE of claim 8, wherein the UE needs assistance in a resource allocation procedure in one or more of the following cases:
   a transmission of one or more packets needs a high reliability and/or a low latency,
   inadequate or no sensing results are available at the UE,
   the UE's power level is below a configured and/or pre-configured threshold,
   the UE wants to improve its power consumption by reducing sensing efforts and limit sensing to a configured and/or pre-configured set of resources or resource pools.

10. The UE of claim 1, wherein, the UE acquires resources available for the transmission by carrying out sensing during the ON duration of one or more DRX cycles.

11. The UE of claim 10 wherein, responsive to a regular DRX cycle configuration, the UE is expected to carry out sensing whenever it is in the ON duration.

12. The UE of claim 1, wherein the UE is to carry out sensing during the listening duration and during at least a part of the ON duration.

13. The UE of claim 1 wherein, when being out-of-coverage, the UE
   is not connected to a base station of the wireless communication system so that the UE does not receive from the base station a sidelink resource allocation configuration or assistance, and/or is connected to a base station of the wireless communication system, which, for one or more reasons, is not capable to provide a sidelink resource allocation configuration or assistance for the UE, and/or is connected to a base station of the wireless communication system not supporting a sidelink service.

14. The UE of claim 1, wherein the UE comprise one or more of a power-limited UE, or a hand-held UE, a UE used by a pedestrian, and referred to as a Vulnerable Road User (VRU), or a Pedestrian UE (P-UE), or an on-body or hand-held UE used by public safety personnel and first responders, and referred to as Public safety UE (PS-UE), or an IoT UE, a sensor, an actuator or a UE provided in a campus network to carry out repetitive tasks and needing input from a gateway node at periodic intervals, or a mobile terminal, or a stationary terminal, or a cellular IoT-UE, or a vehicular UE, or a vehicular group leader (GL) UE, or an IoT or narrowband IoT, NB-IoT, device, or a ground based vehicle, or an aerial vehicle, or a drone, or a moving base station, or road side unit (RSU), or a building, or any other item or device provided with network connectivity enabling the item or device to communicate using the wireless communication network, a sensor or actuator, or any other item or device provided with network connectivity enabling the item or device to communicate using a sidelink with the wireless communication network, a sensor or actuator, or any sidelink capable network entity.

15. A wireless communication system, comprising a plurality of user devices (UEs) configured for a sidelink communication using resources from a set of sidelink resources of the wireless communication system, wherein one or more of the plurality of UEs is to communicate with one or more further UEs using a sidelink (SL), operate in a Discontinuous Reception (DRX) mode, and when being out-of-coverage, acquire one or more resources available for a transmission from an assistance information message (AIM), received from one or more of the further UEs during an ON duration of one or more DRX cycles, and/or from an AIM, received from one or more of the further UEs during a listening duration, and/or by carrying out sensing in a set of sidelink resources or in a sidelink resource pool of the wireless communication system during a listening duration, wherein the listening duration comprises one or more of:

one listening duration preceding the ON duration, the one listening duration being consecutive with the ON duration or being offset from the ON duration by a certain time, one listening duration following the ON duration, the one listening duration being consecutive with the ON duration or being offset from the ON duration by a certain time, a plurality of listening durations preceding the ON duration, the respective listening durations being offset from each other by a certain time, a plurality of listening durations following the ON duration, the respective listening durations being offset from each other by a certain time, and wherein, during the listening duration, the UE is to carry out only sensing or receiving of AIMs and is not to transmit or decode any control information and/or data.

16. The wireless communication system of claim 15, comprising one or more base stations, wherein the base station comprises one or more of a macro cell base station, or a small cell base station, or a central unit of a base station, or a distributed unit of a base station, or a road side unit (RSU), or a UE, or a group leader (GL), or a relay or a remote radio head, or an AMF, or an SMF, or a core network entity, or mobile edge computing (MEC) entity, or a network slice as in the New Radio (NR) or 5G core context, or any transmission or reception point (TRP) enabling an item or a device to communicate using the wireless communication network, the item or device being provided with network connectivity to communicate using the wireless communication network.

17. A method for operating a user device (UE) of a wireless communication system comprising a plurality of user devices (UEs) the method comprising:

operating the UE to communicate with one or more further UEs using a sidelink (SL), operating the UE in a Discontinuous Reception, DRX, mode, and when being out-of-coverage, acquiring, by the UE, one or more resources available for a transmission from an assistance information message (AIM), received from the one or more of the further UEs during an ON duration of one or more DRX cycles, and/or from an AIM, received from the one or more of the further UEs during a listening duration, and/or by carrying out sensing in a set of sidelink resources or in a sidelink resource pool of the wireless communication system during a listening duration, wherein the listening duration comprises one or more of:

one listening duration preceding the ON duration, the one listening duration being consecutive with the ON duration or being offset from the ON duration by a certain time, one listening duration following the ON duration, the one listening duration being consecutive with the ON duration or being offset from the ON duration by a certain time, a plurality of listening durations preceding the ON duration, the respective listening durations being offset from each other by a certain time, a plurality of listening durations following the ON duration, the respective listening durations being offset from each other by a certain time, and wherein, during the listening duration, the UE is to carry out only sensing or receiving of AIMs and is not to transmit or decode any control information and/or data.

18. A non-transitory digital storage medium having a computer program stored thereon to perform, when said computer program is run by a computer, a method for operating a user device (UE) of a wireless communication system comprising a plurality of user devices (UEs) the method comprising:

operating the UE to communicate with one or more further UEs using a sidelink (SL), operating the UE in a Discontinuous Reception (DRX) mode, and when being out-of-coverage, acquiring, by the UE, one or more resources available for a transmission from an assistance information message (AIM), received from the one or more of the further UEs during an ON duration of one or more DRX cycles, and/or from an AIM, received from the one or more of the further UEs during a listening duration, and/or by carrying out sensing in a set of sidelink resources or in a sidelink resource pool of the wireless communication system during a listening duration, wherein the listening duration comprises one or more of:
  one listening duration preceding the ON duration, the one listening duration being consecutive with the ON duration or being offset from the ON duration by a certain time,
  one listening duration following the ON duration, the one listening duration being consecutive with the ON duration or being offset from the ON duration by a certain time,
  a plurality of listening durations preceding the ON duration, the respective listening durations being offset from each other by a certain time,
  a plurality of listening durations following the ON duration, the respective listening durations being offset from each other by a certain time, and
wherein, during the listening duration, the UE is to carry out only sensing or receiving of AIMs and is not to transmit or decode any control information and/or data.

* * * * *